(12) United States Patent
Konno et al.

(10) Patent No.: US 8,730,520 B2
(45) Date of Patent: May 20, 2014

(54) IMAGE PROCESSING METHOD, IMAGE PROCESSING APPARATUS AND INKJET PRINTING METHOD USING DETERMINED EJECTION AMOUNTS OF INK

(75) Inventors: Yuji Konno, Kawasaki (JP); Hinako Iritani, Kawasaki (JP); Yuji Hamasaki, Kawasaki (JP); Takeshi Yazawa, Yokohama (JP); Satoshi Seki, Kawasaki (JP); Eiichi Nakata, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 315 days.

(21) Appl. No.: 13/197,188

(22) Filed: Aug. 3, 2011

(65) Prior Publication Data

US 2012/0050762 A1   Mar. 1, 2012

(30) Foreign Application Priority Data

Aug. 31, 2010 (JP) ................. 2010-194742

(51) Int. Cl.
*H04N 1/60* (2006.01)

(52) U.S. Cl.
USPC ............................ 358/1.9; 358/3.27; 358/518

(58) Field of Classification Search
USPC ........... 358/1.1, 1.9, 3.27, 500, 501, 518, 523
See application file for complete search history.

(56) References Cited

U.S. PATENT DOCUMENTS

| | | | |
|---|---|---|---|
| 7,130,083 B1 | 10/2006 | Konno et al. | |
| 7,477,422 B2 | 1/2009 | Konno et al. | |
| 2011/0141502 A1* | 6/2011 | Narumi et al. | 358/1.9 |

FOREIGN PATENT DOCUMENTS

JP    2004-181688 A    7/2004

OTHER PUBLICATIONS

S. Koganehira, "Development of Pigment Inkjet Ink (the PX-G ink) that Excels in Gloss", Journal of the Imaging Society of Japan, Nov. 11, 2004, pp. 74-81, vol. 43. No. 6 (with abstract).

* cited by examiner

*Primary Examiner* — Thomas D Lee
(74) *Attorney, Agent, or Firm* — Fitzpatrick, Cella, Harper & Scinto

(57) ABSTRACT

An image processing method includes the steps of converting input image data to ink color data corresponding to each amount of a plurality of colors of achromatic inks used for printing, and generating printing data for first, second and third achromatic inks based on the ink color data. The printing data is used for printing by causing a printing head to scan a common image area in a printing medium a plurality of times, the printing head ejecting the plurality of colors of inks. The converting step converts the input image data to ink color data for the first, second and third achromatic inks so that the first achromatic ink is used with respect to a value of the input image data indicating achromatic color, and the generating step generates the printing data for the first, second and third achromatic inks so as to (a) make a printing duty for the first achromatic ink during first half of the plurality of scans higher than a printing duty for the first achromatic ink during the latter half of the plurality of scans, and (b) make printing duties for the second and third achromatic inks during the latter half of the scans higher than in the first half of the scans.

23 Claims, 25 Drawing Sheets

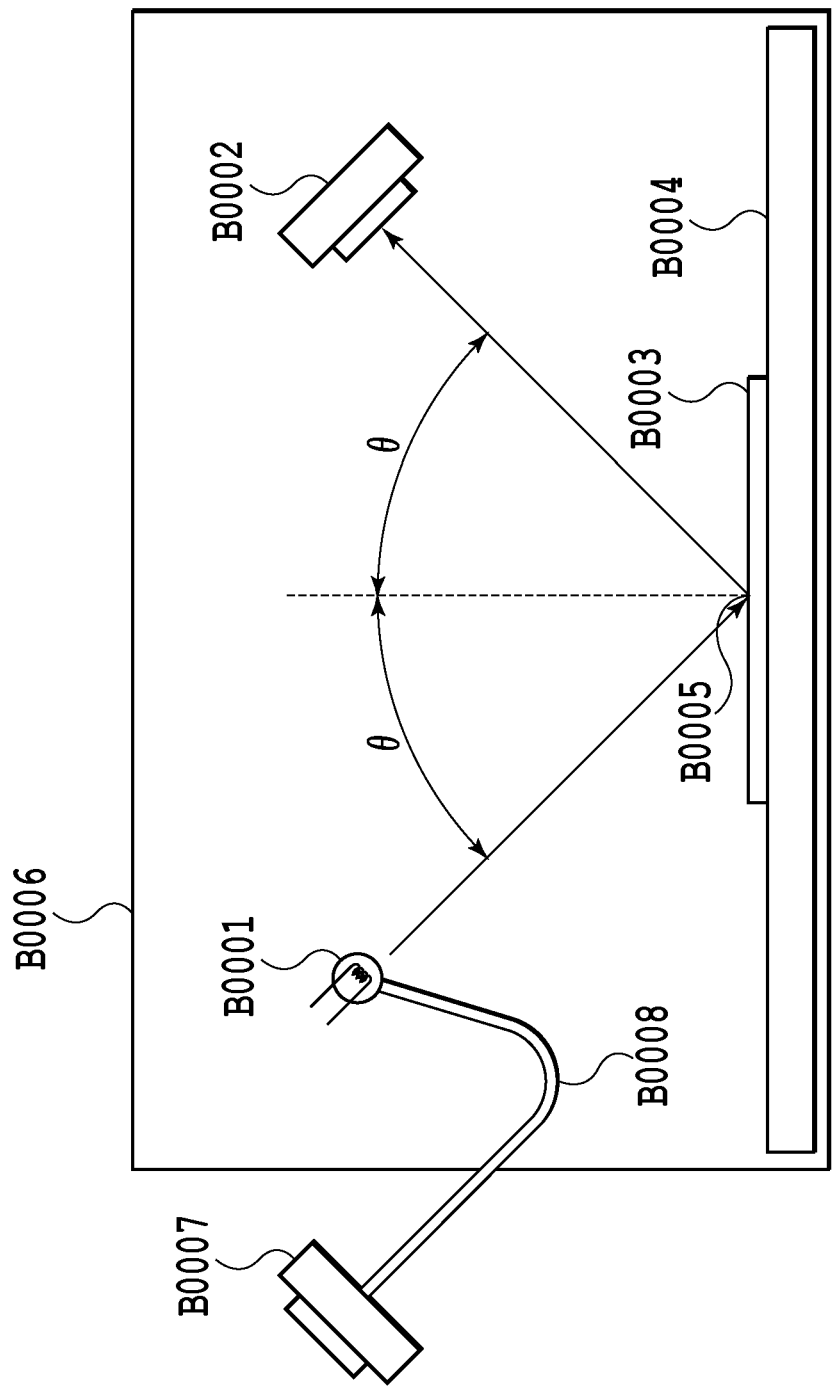

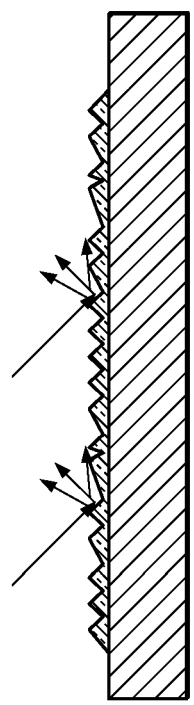
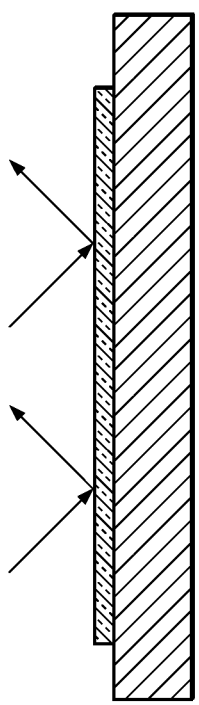
FIG.3A
FIG.3B

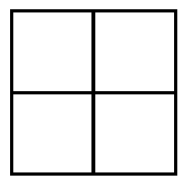
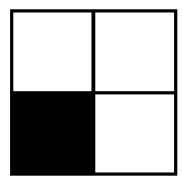
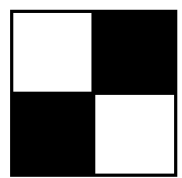
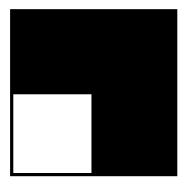
Level  0   1   2   3   4
FIG.10

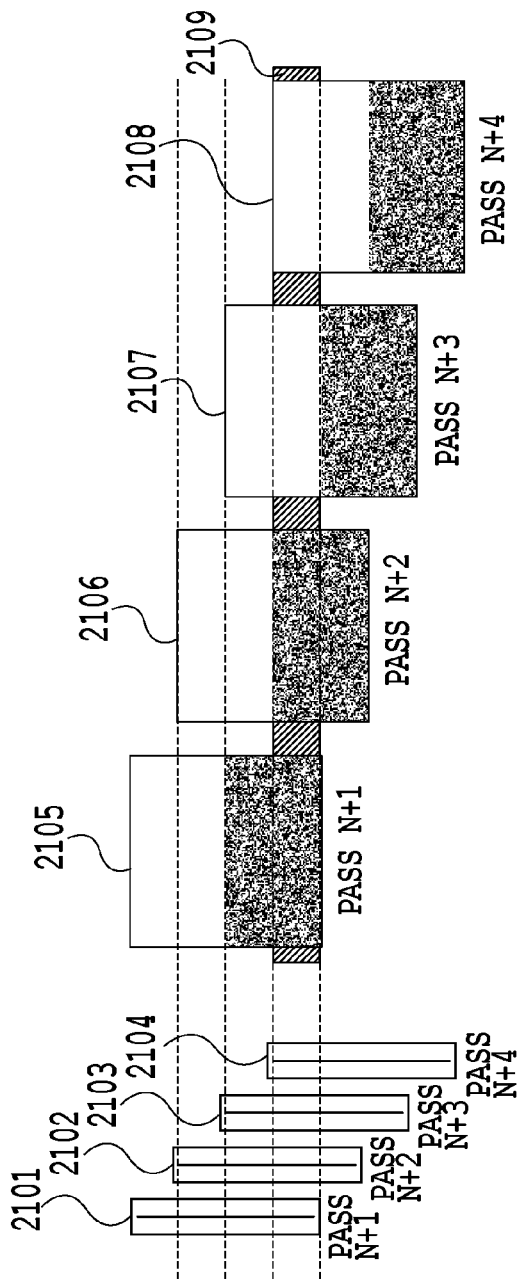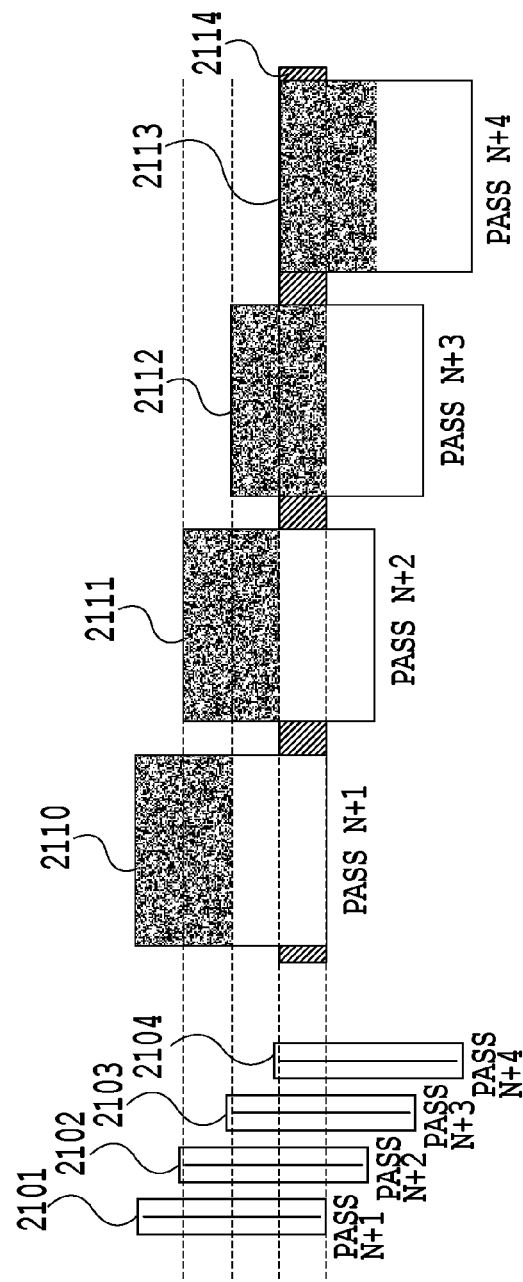
FIG.21A
FIG.21B

|  |  | COLORED INK |  |  |  |  |  |  |  |
|---|---|---|---|---|---|---|---|---|---|
|  |  | 1 | 2 | 3 | 4 | 5 | 6 | 7 | 8 |
| PIGMENT DISPERSION LIQUID | 1 |  |  |  |  |  |  |  |  |
|  | 2 |  | 10 |  | 30 | 10 | 30 | 10 |  |
|  | 3 |  |  | 5 |  |  |  |  |  |
|  | 4 | 30 |  |  |  |  |  |  | 30 |
| ESIN SOLUTION A |  | 2 | 6 | 29 | 2 | 6 | 2 | 6 | 2 |
| GLYCERIN |  | 5.0 | 5.0 | 5.0 | 5.0 | 5.0 | 5.0 | 5.0 | 5.0 |
| DIETHYLENE GLYCOL |  | 5.0 | 5.0 | 5.0 | 5.0 | 5.0 | 5.0 | 5.0 | 5.0 |
| POLYETHYLENE GLYCOL 1000 |  | 5.0 | 5.0 | 5.0 | 5.0 | 5.0 | 5.0 | 5.0 | 5.0 |
| SARFINOL 465 |  | 1.0 | 1.0 | 1.0 | 1.0 | 1.0 | 1.0 | 1.0 | 1.0 |
| DEIONIZED WATER |  | 52 | 68 | 50 | 52 | 68 | 52 | 68 | 52 |
| INK TYPE |  | K | Gy | LGy | M | LM | C | LC | Y |

FIG.22

|  | PIGMENT DENSITY (%) | RESIN AMOUNT (%) |
|---|---|---|
| BLACK (K) | 3.0 | 0.8 |
| GRAY (Gr) | 1.0 | 0.8 |
| LIGHT GRAY (LGr) | 0.5 | 3.0 |

FIG.23

|  | PIGMENT DENSITY (%) | RESIN AMOUNT (%) |
| --- | --- | --- |
| BLACK (K) | 4.0 | 0.8 |
| GRAY (Gr) | 1.0 | 0.8 |
| LIGHT GRAY (LGr) | 0.5 | 3.0 |

FIG.24

IMAGE PROCESSING METHOD, IMAGE PROCESSING APPARATUS AND INKJET PRINTING METHOD USING DETERMINED EJECTION AMOUNTS OF INK

BACKGROUND OF THE INVENTION

1. Field of the Invention

The present invention relates to an image processing method and image processing apparatus that process data for performing printing using ink, and to an inkjet printing method that performs printing using ink.

2. Description of the Related Art

In inkjet printing, the capability to form high-quality images on various kinds of printing media is strongly desired. Particularly, in recent years, photo quality is desired, and glossy paper capable of achieving the same image quality and texture as silver halide photos is widely available in the market. Moreover, together with the increasing demand for image quality, there is also a demand for the same resistance to weather as silver halide photos, and as measures for achieving that, inkjet printers that use pigment ink having high robustness of the coloring material itself are increasing.

As one problem with inkjet printers that use this kind of pigment ink is a bronzing phenomenon that occurs due to discoloration of regular reflected light. This bronzing phenomenon is a phenomenon that occurs as a result of the ratio of the wavelength component of the absorption band of pigment in reflected light becoming large due to selective reflection on the pigment particle surface when particles of pigment coloring material are exposed on the surface of the printing medium. Particularly, when using cyan pigment, reflected light causes a reddish color to occur, and causes the visual quality of the image to be greatly degraded.

As one method to reduce the bronzing phenomenon is a method of laminating a transparent film over the printed surface so that the pigment particles are not exposed on the surface of the printing medium. However, there are various problems with this method in that having a mechanism for that kind of lamination increases the cost of the printing apparatus, and the lamination work itself takes a lot of time.

As another technique is a technique disclosed in Japanese Patent Publication No. 4,066,338 of overcoating a printing medium with yellow ink. More specifically, after an image is formed on a printing medium using cyan, magenta and yellow ink, overcoating is performed at a printing rate of 10% or less using a yellow ink for which the bronzing phenomenon does not easily occur, which suppresses the bronzing phenomenon in especially the cyan hue.

Incidentally, in the technique disclosed in Japanese Patent Publication No. 4,066,338, there is a problem in that as the color changes due to overcoating of yellowing ink, color reproducibility is affected. Particularly, change of gray colors which are severe to the color change upsets the gray balance, and the degradation of image quality becomes even worse. In recent years, the printing monochrome photos with an inkjet printer is also increasing, and inkjet printers having a special printing mode for printing monochrome photos are being sold. In a special monochrome photo mode, the gray balance is the most important item related to image quality, and when the method of overcoating using yellow ink as disclosed in Japanese Patent Publication No. 4,066,338 is used, the effect on color reproducibility is especially large.

SUMMARY OF THE INVENTION

The object of the present invention is to suppress the bronzing phenomenon in inkjet printing using pigment ink, while at the same time keeping the effect on color reproducibility to a minimum.

The present invention provides an image processing method, includes the steps of:

converting input image data to ink color data corresponding to each amount of a plurality of colors of inks used for printing, the plurality of colors of inks including at least a first achromatic ink, a second achromatic ink having a higher printing density and a lower resin density than the first achromatic ink, and generating printing data for the first, second achromatic ink based on the ink color data, the printing data being used for printing by causing a printing head to scan a common image area in a printing medium a plurality of times, the printing head ejecting the plurality of colors of inks, wherein the converting step comprises converting the input image data to ink color data for the first and second achromatic inks so that the first achromatic ink is used with respect to a value of the input image data indicating achromatic color, the value being within a range below a specified value except for a minimum value, the specified value being greater than a lower limit in a range where the second achromatic ink is used; and the generating step comprises generating the printing data for the first and second achromatic inks so as to (a) make a printing duty for the first achromatic ink during first half of the plurality of scans higher than a printing duty for the first achromatic ink during the latter half of the plurality of scans, and (b) make printing duties for the second achromatic ink during the latter half of the scans higher than in the first half of the scans, respectively.

Further features of the present invention will become apparent from the following description of exemplary embodiments (with reference to the attached drawings).

BRIEF DESCRIPTION OF THE DRAWINGS

FIG. 1 is a diagram schematically illustrating a bronzing measurement system;

FIGS. 3A and 3B are diagrams explaining the relationship between the uneven surface state of the printing surface and the diffused state of regular reflected light;

FIG. 10 is a diagram explaining dot patterns used by an inkjet printer of the present invention;

FIGS. 21A and 21B are diagrams explaining multi-pass processing that uses the mask patterns used in the first embodiment;

FIG. 22 is a diagram explaining the preparation of eight kinds of inks used in the first embodiment;

FIG. 23 is a diagram explaining the density of pigment and the amount of resin for three achromatic inks used in the first embodiment;

FIG. 24 is a diagram explaining the density of pigment and the amount of resin for three achromatic inks used in the second embodiment;

DESCRIPTION OF THE EMBODIMENTS

In the following, preferred embodiments of the present invention will be exemplarily explained in detail with reference to the accompanying drawings.

(Bronzing Phenomenon and Evaluation Method)

Figure 2B:
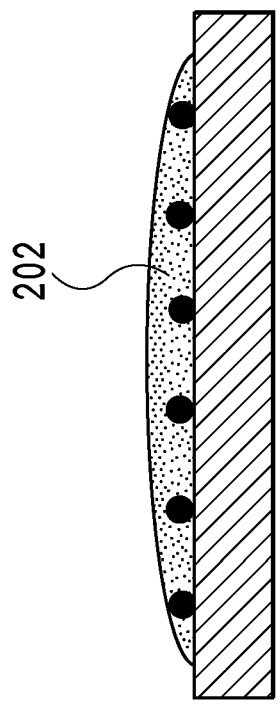
FIGS. 2A and 2B are diagrams illustrating the state of pigment coloring material and resin fixed to a paper surface.
Figure 2A:
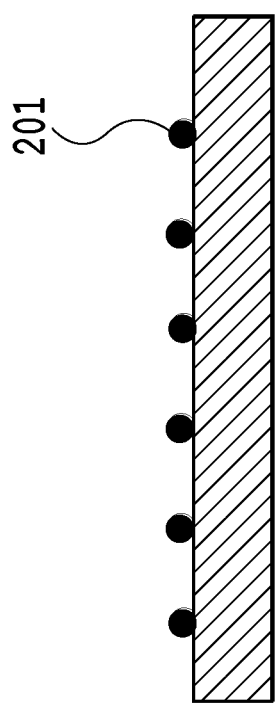

The bronzing phenomenon, as mentioned in the background is a phenomenon that occurs when the regular reflected light of lighting that is shone onto a printed surface that has been printed using pigment coloring material discolors to a color different than the color of the lighting. This bronzing phenomenon, as illustrated in FIG. 2A, is a phenomenon that occurs as a result of the ratio of wavelength component in the absorption band of pigment in reflected light becoming large due to selective reflection of light on the surface of pigment particles when pigment coloring material particles 201 are exposed on the surface of a printing medium, and as illustrated in FIG. 2B, a method of suppressing this phenomenon is a method of covering the printed surface with laminate or overcoating in a form such as illustrated by 202 so that the pigment coloring material is not exposed.

Moreover, as illustrated in FIG. 3A, in a state where the smoothness of the printed surface is high and the glossiness is high, the intensity of regular reflected light also becomes high, so that it is easier for bronzing to become noticeable. On the other hand, as illustrated in FIG. 3B, when the surface unevenness is relatively large, regular reflected light is easily diffused by the surface, and the intensity of the regular reflected light become low, so that it is more difficult for bronzing to become noticeable.

The bronzing phenomenon can be measured quantitatively by a method described below. For example, using a three-dimensional spectrophotometric color measurement system (GCMS-4) manufactured by Murakami Color Research Laboratory Co., Ltd., the color of regular reflected light can be measured by shining light onto a unit patch of glossy paper printed with a pigment ink from a 45° direction, and receiving light at a 45° position in the opposite direction.

FIG. 1 is a diagram that schematically illustrates this measurement system. In FIG. 1, B0001 is a lighting unit that shines light onto a printing medium B0003 that is the object of evaluation. In the figure, B0002 is a light detection unit that detects reflected light from the printing medium B0003. The light detection unit B0002 is placed at a location on the opposite side from the lighting unit B0001 at the same angle θ with respect to the normal direction of the printing medium B0003, or in other words, is placed in the direction of regular reflection. B0004 is a fixing board to which the printing medium B0003, of which a patch is printed as the object of evaluation, is fixed. B0005 is the measurement area that the light detection unit B0002 measures. B0006 is a light-blocking unit that blocks light from the outside.

Next, the method of calculating the bronzing characteristics from the regular reflected light of the measured printing medium will be explained. The spectral intensity of the regular reflected light from the printing medium B0003 that is measured by the light detection unit B0002 is represented as below.

$$R_X(\lambda)$$

From this, the tristimulus values XxYxZx of the regular reflected light are calculated from Equations (1) below.

$$X_X = \int_{380}^{780} R_X(\lambda)\bar{x}(\lambda)d\lambda$$

$$Y_X = \int_{380}^{780} R_X(\lambda)\bar{y}(\lambda)d\lambda$$

$$Z_X = \int_{380}^{780} R_X(\lambda)\bar{z}(\lambda)d\lambda \quad (1)$$

However, in Equations (1) above, the regular reflected light in the optical system in FIG. 1 is measured, so that, for example, in the case where the level of glossiness is high such as for glossy paper, the range of the measurement values of the regular reflected light approaches that of the light source. In other words, this case resembles a measurement system that measures light from the light source directly. Therefore, differing from the calculation of tristimulus values of the color of an object using normal reflection, the spectral intensity of regular reflected light is regarded as being a relative spectral power distribution of the light source, and is performed according to a calculation method of calculating the tristimulus values of the light source color. In Equations (1), the values $$\bar{x}(\lambda), \bar{y}(\lambda), \bar{z}(\lambda)$$

are color matching functions according to JIS Z 8782. Moreover, here, normalization is not performed according to multiplication of proportionality constants; however, $$K = \frac{100}{\int_{380}^{780} \bar{y}(\lambda)d\lambda} \quad (2)$$

normalization can be performed by multiplying with Equation (2).

Using a white board, such as a perfect diffuse reflector, as the object of measurement, the spectral intensity of the lighting B0001, which is measured by B0002 measuring the spectral intensity of the regular reflected light, is given by $$S(\lambda).$$

and from this, the tristimulus values Xs, Ys, Zs of the lighting are calculated using Equations (3) below. Equations (3) are based on a calculation method for calculating the tristimulus values of a light-source color, and are conversion equations that calculate the tristimulus values Xs, Ys, Zs from spectral data of the lighting.

$$X_S = k \int_{380}^{780} S(\lambda) \bar{x}(\lambda) d\lambda$$

$$Y_S = k \int_{380}^{780} S(\lambda) \bar{y}(\lambda) d\lambda$$

$$Z_S = k \int_{380}^{780} S(\lambda) \bar{z}(\lambda) d\lambda \qquad (3)$$

In Equations (3)

$$\bar{x}(\lambda), \bar{y}(\lambda), \bar{z}(\lambda)$$

are color-matching function according to JIS Z 8782. Also, in Equations (3) k is a proportionality constant. The value of the tristimulus value Ys is set so that it matches the amount of measured light.

Next, from the tristimulus values Xx, Yx, Zx of the regular reflected light detected by B0002 of the printing medium B0003, which is the object of evaluation, and the tristimulus values Xs, Ys, Zs of the lighting B0001, the L*a*b* value of the regular reflected light of B0003 is calculated based on JIS Z 8729. However, the tristimulus values (Xx, Yx, Zx) of the regular reflected light of B0003 are used for the values of X, Y, Z in Equations (1) to Equations (4) of JIS Z 8729, and the tristimulus values (Xs, Ys, Zs) of the light source are used for the values Xn, Yn, Zn. In other words, the values of a* and b* are calculated using Equations (4) below.

$$a^* = 500 \left[ f\left(\frac{X_X}{X_S}\right) - f\left(\frac{Y_X}{Y_S}\right) \right] \qquad (4)$$

$$b^* = 200 \left[ f\left(\frac{Y_X}{Y_S}\right) - f\left(\frac{Z_X}{Z_S}\right) \right]$$

Figure 6:
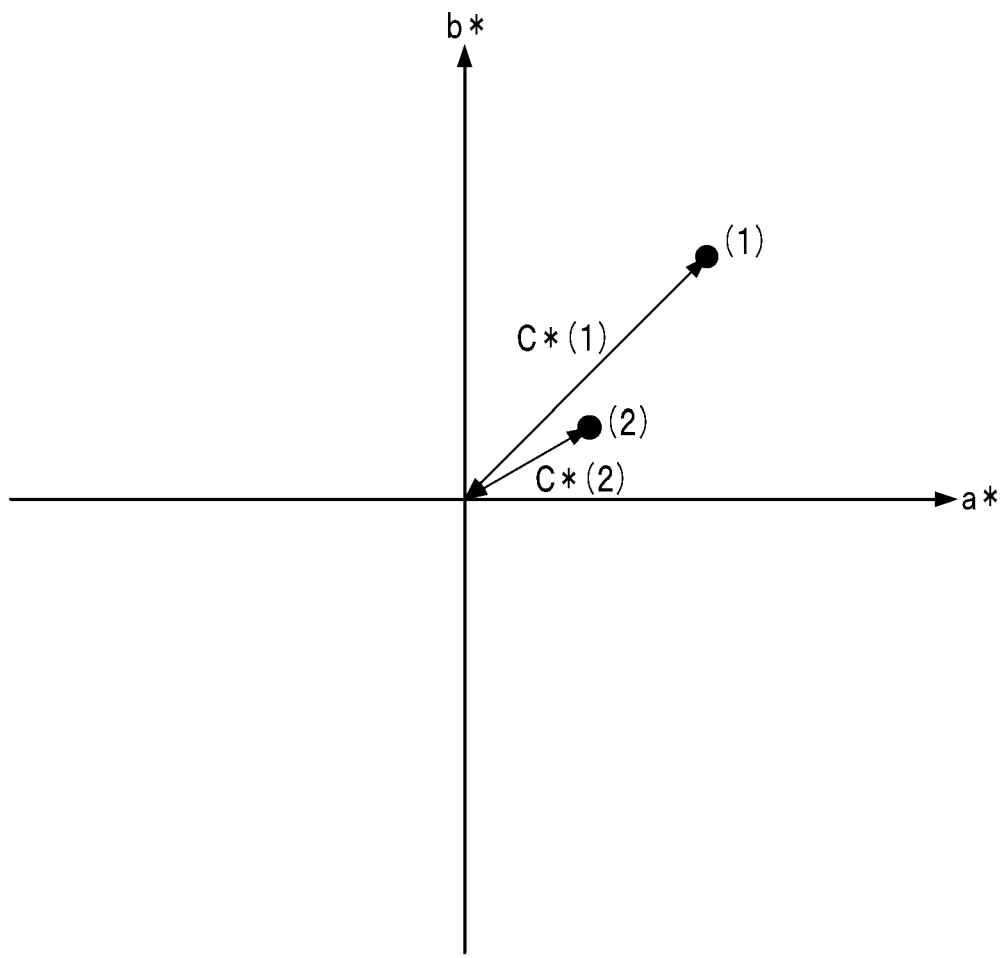
FIG. 6 is a diagram in which the measurement results of bronzing are plotted on an a*b* plane.

Wherein,

If $\frac{X_X}{X_S} > 0.008856$, Then $f\left(\frac{X_X}{X_S}\right) = \left(\frac{X_X}{X_S}\right)^{\frac{1}{3}}$ If $\frac{X_X}{X_S} \leq 0.008856$, Then $f\left(\frac{X_X}{X_S}\right) = 7.78 \frac{X_X}{X_S} + \frac{16}{116}$ If $\frac{Y_X}{Y_S} > 0.008856$, Then $f\left(\frac{Y_X}{Y_S}\right) = \left(\frac{Y_X}{Y_S}\right)^{\frac{1}{3}}$ If $\frac{Y_X}{Y_S} \leq 0.008856$, Then $f\left(\frac{Y_X}{Y_S}\right) = 7.78 \frac{Y_X}{Y_S} + \frac{16}{116}$ If $\frac{Z_X}{Z_S} > 0.008856$, Then $f\left(\frac{Z_X}{Z_S}\right) = \left(\frac{Z_X}{Z_S}\right)^{\frac{1}{3}}$ If $\frac{Z_X}{Z_S} \leq 0.008856$, Then $f\left(\frac{Z_X}{Z_S}\right) = 7.78 \frac{Z_X}{Z_S} + \frac{16}{116}$ In the following, the measurement results of measuring a printed surface according to the measurement method above are illustrated in FIG. 6 as a plot in the a*b* plane. In FIG. 6, (1) is a plot of the bronzing values of a printed surface in which bronzing is visually noticeable, and (2) is a plot of bronzing values of a printed surface in which bronzing is relatively unnoticeable. In the figure, C* (1) and C* (2) illustrate the calculation results of the saturation $C^* = \sqrt{(a^{*^2} + b^{*^2})}$ that are calculated from bronzing values L*a*b*, and when this value is large, saturation of the bronzing color is large and bronzing becomes noticeable. As a result, as in the case of L*a*b* of diffused light when measuring normal color, it is possible to quantify the bronzing value in the a*b* plane by finding the hue and saturation of the bronzing color.

(Apparatus Configuration)

Figure 4:
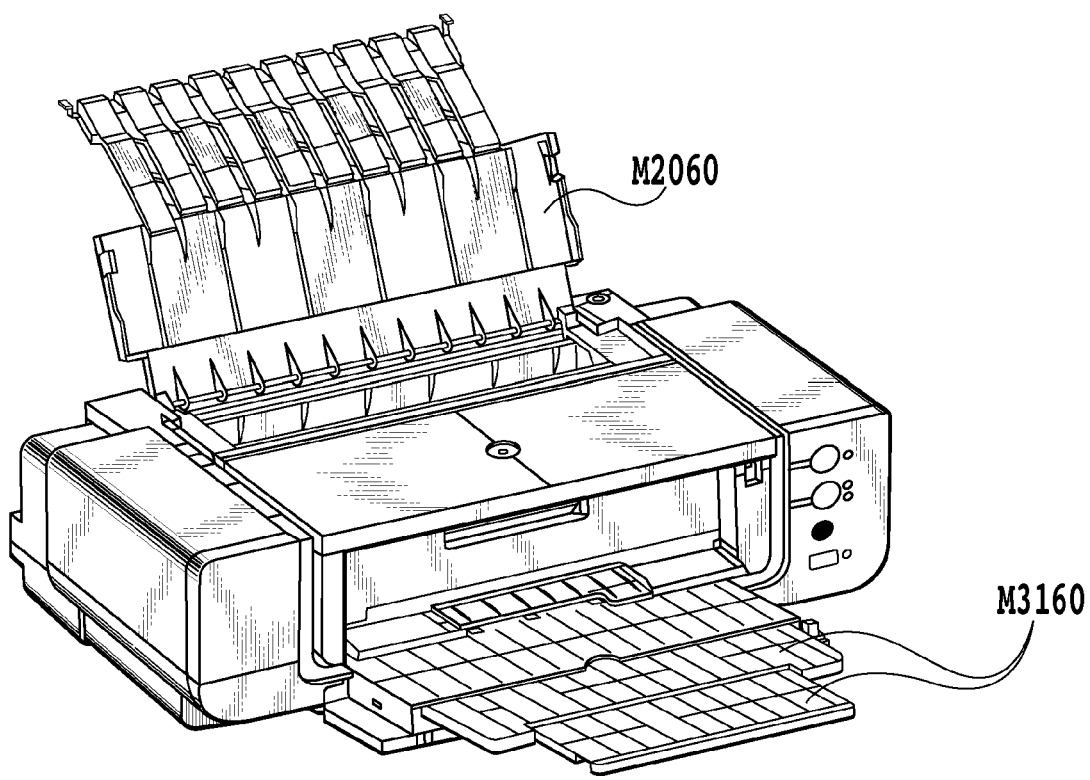
FIG. 4 is a perspective diagram illustrating the external appearance of an inkjet printer that is used in embodiments of the present invention.
Figure 5:
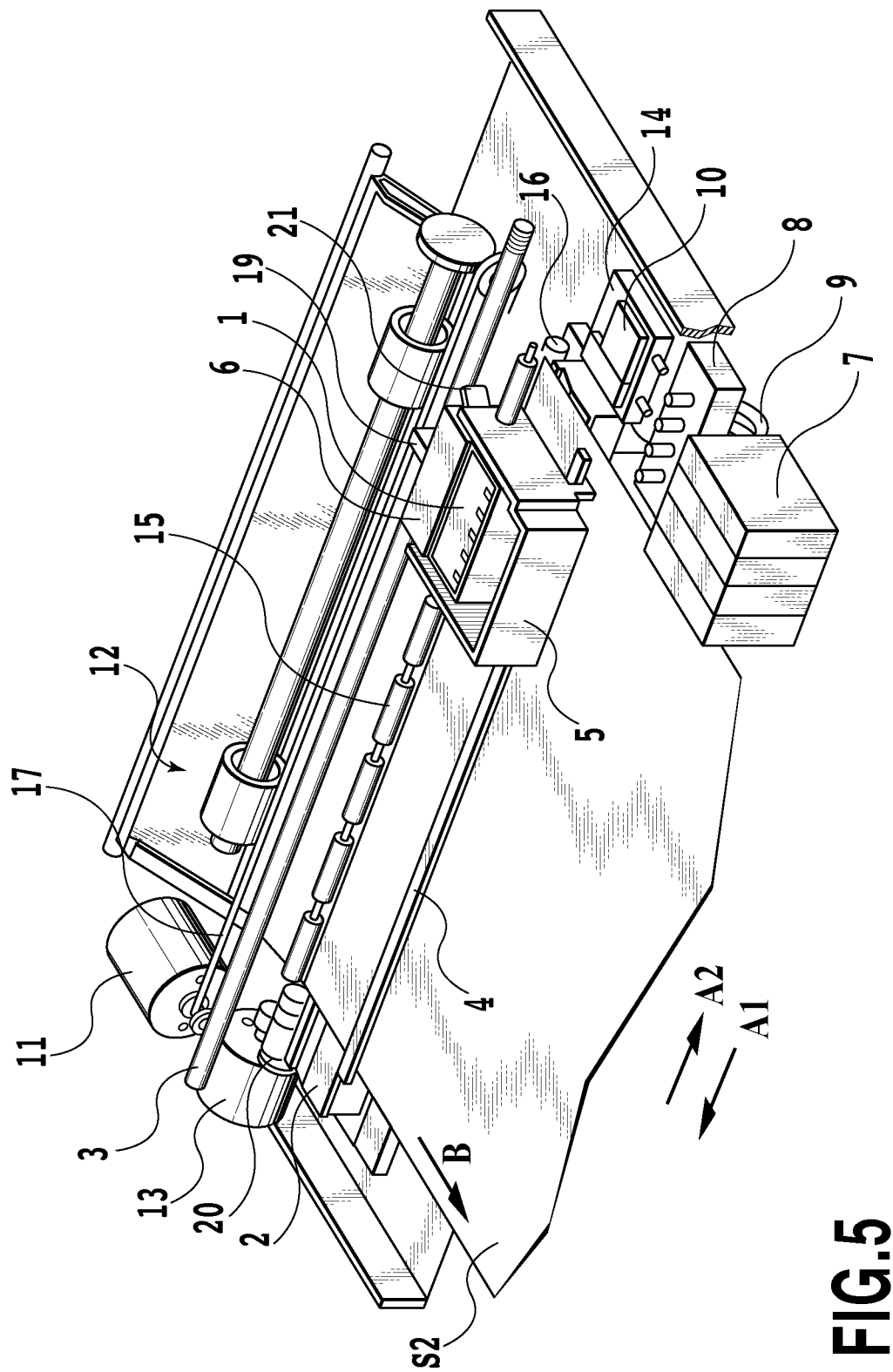
FIG. 5 is a perspective diagram illustrating the inside of an inkjet printer that is used in embodiments of the present invention.

FIG. 4 is a perspective drawing illustrating the external appearance of an inkjet printer that is used in this embodiments, and FIG. 5 is a perspective drawing of the inside of the inkjet printer.

In this embodiment, as illustrated in FIG. 4, after printing medium is inserted from the supply tray 12 in the direction indicated by the arrow, the printing medium is intermittently conveyed and an image is formed, after which the printing medium is discharged from the discharge tray M3160.

Figure 7:
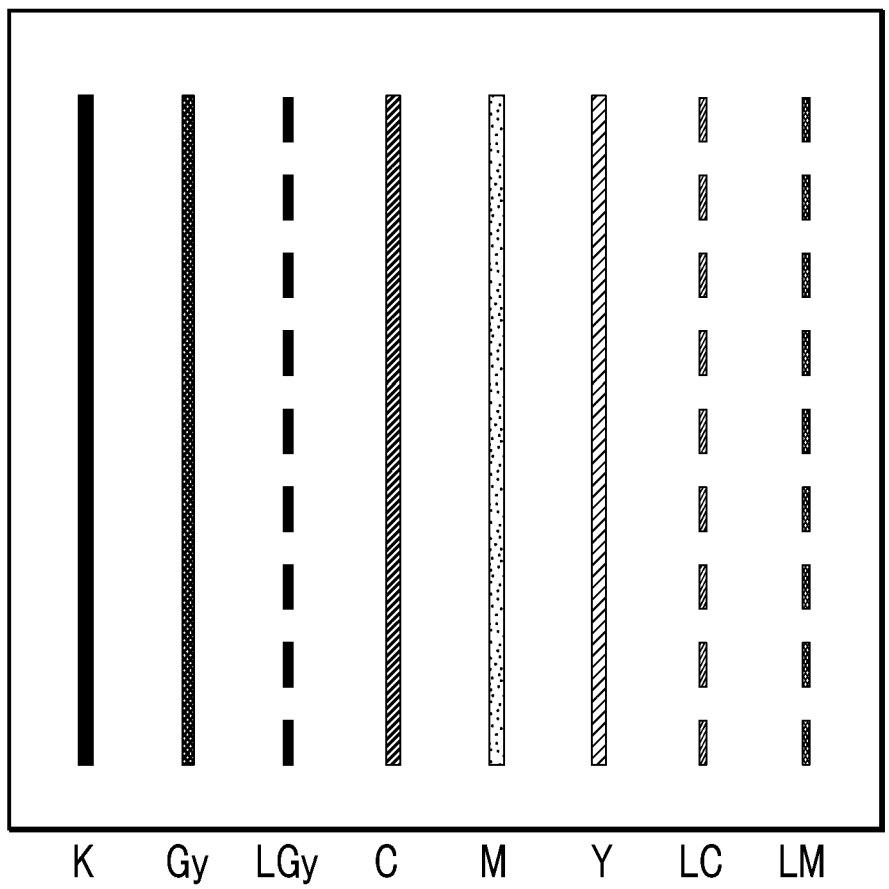
FIG. 7 is a diagram illustrating the arrangement of nozzle arrays that eject eight colors of inks that are installed in a printing head used in embodiments of the present invention.

In FIG. 5, a printing head 1, which is mounted in a carriage 5, ejects ink from nozzles while moving back-and-forth along a guide rail 4 in the direction of the arrows A1 and A2 and forms an image on a printing medium S2. The printing head 1, for example, has a plurality of nozzle groups that correspond to the respective different colors of ink. For example, there are nozzle groups that eject a total of 8 colors; five chromatic colors of ink cyan (C), magenta (M), yellow (Y), light cyan (LC) and light magenta (LM) that will be described later, and three achromatic colors (similar colors) black (K), gray (Gy) and light gray (LGy) having different printing densities. The inks of each of these colors are stored in ink tanks (not illustrated in the figure), and supplied to the printing head 1 from the ink tanks. The arrangement of nozzle arrays that eject the eight colors of ink that are mounted in the printing head is illustrated in FIG. 7. Moreover, the ejection amount of the printing head 1 used in the inkjet printer of this invention is 3pl, which is the same for all colors, and the nozzle diameter of each nozzle array is set so that 3pl can be ejected.

In this embodiment, the inkjets and printing head 1 are integrated to form a head cartridge 6, and the head cartridge 6 is mounted in the carriage 5.

Moreover, by transmitting the driving force of the carriage motor 11 to the carriage 5 by way of a timing belt 17, the carriage 5 is moved back-and-forth along a guide shaft 3 and guide rail 4 in the direction of the arrows A1, A2 (main scanning direction). When moving the carriage, the carriage position is detected by an encoder sensor 21 located in the carriage 5 that reads a linear scale 19 that is provided along the direction of movement of the carriage. Printing on the printing medium is started by this back-and-forth movement. At that time, the printing medium S2 is supplied from a paper-supply tray 12, held between a conveying roller 16 and pinching rollers 15 and conveyed to the platen 2.

Next, when the carriage 5 performs one scan of printing in the A1 direction, a conveying motor 13 drives the conveying roller 16 by way of a linear wheel 20. The paper medium S2 is then conveyed a specified amount in the direction of arrow B, which is the sub-scanning direction. After that, printing is performed on the printing medium S2 while the carriage 5 scans in the A2 direction. As illustrated in FIG. 5, there is a head cap 10 and recovery unit 14 at the home position, and when necessary, they intermittently perform a recovery process of the printing head 1.

After one sheet of printing medium has been printed by repeating the operation explained above, the printing medium is discharged and printing of one sheet is completed.

Figure 8:
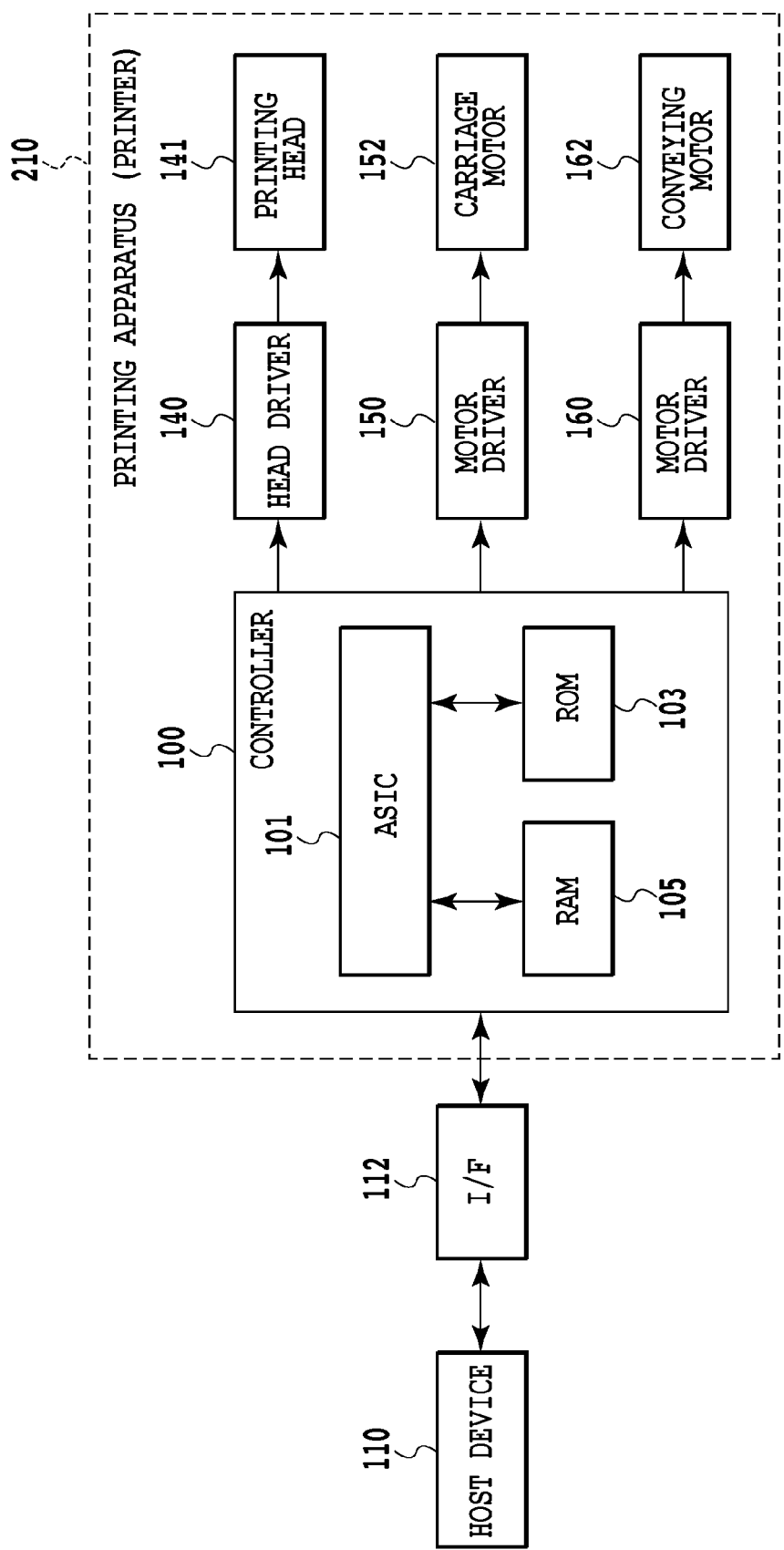
FIG. 8 is a block diagram illustrating the control configuration of an inkjet printer in an embodiment of the invention.

FIG. 8 is a block diagram illustrating the control configuration of an inkjet printer in this embodiment. A controller 100 is the main control unit, and for example, has a microcomputer ASIC 101, ROM 103 and RAM 105. The ROM 103 stores dot arrangement patterns, mask patterns and other fixed data. The RAM 105 has an area for expanding image data, and a work area. The ASIC 101 reads programs from ROM 103 and executes a series of processes until image data is printed on a printing medium.

A host device 110 is a supply source of image data that will be explained later (in addition to being a computer that creates and processes data such as data for an image to be printed, may also have the form of being a reader for reading an image). Image data and other commands and status signals are transmitted and received by the controller 100 via an interface (I/F) 112.

A head driver 140 is a driver that drives the printing head 1 according to printing data and the like. A motor driver 150 is a driver that drives a carriage motor 11, and a motor driver 160 is a driver that drives a conveying motor 13.

(Ink Composition)

Here, each of the components of the pigment ink used by the inkjet printer of this embodiment will be explained.

(Aqueous Medium)

Preferably, an aqueous medium containing water and a water soluble organic solvent is used for the ink used in the present invention. The amount of water soluble organic solvent contained in the ink (mass %) is preferably no less than 3.0 mass % and no greater than 50.0 mass % of the total mass of the ink as a reference. Moreover, the amount of water contained in the ink (mass %) is preferably no less than 50.0 mass % and no greater than 95.0 mass % of the total mass of the ink as a reference.

More specifically, the following, for example, can be used as the water soluble organic solvent. Alkyl alcohols having a carbon number of 1 to 6, such as methanol, ethanol, propanol, propanediol, butanol, butanediol, pentanol, pentanediol, hexanol, and hexanediol. Amides such as dimethylformamide and dimethylacetamide. Ketone or ketoalcohols such as acetone and diacetone alcohol. Ethers such as tetrahydrofuran and dioxane. Polyalkylene glycols having a mean molecular weight of 200, 300, 400, 600 and 1000, such as polyethylene glycol and polypropylene glycol. Alkylene glycols having an alkylene base with a carbon number of 2 to 6 such as ethylene glycol, propylene glycol, butylene glycol, triethylene glycol, 1,2,6-hexane trial, thiodiglycol, hexylene glycol and diethylene glycol. Low-grade alkylether acetate such as polyethylene glycol monomethyl ether acetate. Glycerin. Low-grade alkyl ethers of polyalcohols such as ethylene glycol monomethyl (or ethyl)ether, diethylene glycol methyl (or ethyl)ether and triethylene glycol monomethyl (or ethyl) ether. N-methyl-2-pyrolidone, 2-pyrolidone, 1,3-dimethyl-2-imidazolidinone and the like. Moreover, preferably deionized water (ion-exchanged water) is used as the water.

(Pigment)

Preferably, carbon black or an organic pigment is used for the pigment. The amount of pigment contained in the ink (mass %) is preferably no less than 0.1 mass % and no greater than 15.0 mass % of the total mass of the ink as a reference.

Preferably carbon black such as furnace black, lamp black, acetylene black and channel black are used as the pigment for black ink. More specifically, the following commercially available products, for example, can be used. Raven: 7000, 5750, 5250, 5000 ULTRA, 3500, 2000, 1500, 1250, 1200, 1190 ULTRA-II, 1170, 1255 (manufactured by Columbian Chemicals Company). Black Pearls L, Regal: 330R, 400R, 660R; Mogul L, Monarch: 700, 800, 880, 900 1000, 1100, 1300, 1400, 2000; Vulcan XC-72R (manufactured by Cabot Corporation). Color black: FW1, FW2, FW2V, FW18, FW200, 5150, 5160, 5170; Printex: 35, U, V, 140U, 140V; Special black: 6, 5, 4A, 4 (manufactured by Degussa (Evonik Carbon Black GmbH)). No. 25, No. 33, No. 40, No. 47, No. 52, No. 90, No. 2300, MCF-88, MA600, MA7, MA8, MA100 (manufactured by Mitsubishi Chemical Corporation). Moreover, it is possible to use newly prepared carbon black for the present invention. Of course, the present invention is not limited to these, and it is also possible to use any conventional carbon black. Furthermore, the black pigment is not limited to carbon black, and it is possible to use pigment such as magnetic particles like magnetite and ferrite, or pigment such as black titanium oxide and the like.

More specifically, the following pigments can be used for the organic pigment. Water-insoluble azo pigments such as toluidine red, toluidine maroon, hansa yellow, benzidine yellow and pyrazolone red. Water soluble azo pigment such as lithol red, helio bordeaux, pigment scarlet, and permanent red 2B. A derivative composed of a vat dye such as alizarin, indathrone and thioindigo maroon. Phthalocyanine pigment such as phthalocyanine blue and phthalocyanine green. Quinacridone pigment such as quinacridone red and quinacridone magenta. Perylene pigment such as perylene red and perylene scarlet. Isoindolinone pigment such as isoindolinone yellow and isoindolinone orange. Imidazolone pigment such as benzimidazolone yellow, benzimidazolone orange and benzimidazolone red. Pyranthrone pigment such as pyranthrone red and pyranthrone orange. Indigo pigment, condensed azo pigment, thioindigo pigment and diketopyrrolopyrrole pigment. Flavanthrone yellow, acylamido yellow, quinophthalone yellow, nickel azo yellow, copper azomethine yellow, purinone orange, anthrone orange, dianthraquinonyl red and dioxazine violet. Of course the present invention is not limited to these.

Moreover, when indicating the organic pigment by a color index number (C.I.), the following pigments, for example, can be used. C.I. pigment yellow: 12, 13, 14, 17, 20, 24, 74, 83, 86, 93, 97, 109, 110, 117, 120, 125, 128, 137, 138, 147, 148, 150, 151, 153, 154, 166, 168, 180 and 185. C.I. pigment orange: 16, 36, 43, 51, 55, 59, 61 and 71. C.I. pigment red: 9, 48, 49, 52, 53, 57, 97, 122, 123, 149, 168, 175, 176, 177, 180 and 192. C.I. pigment red: 215, 216, 217, 220, 223, 224, 226, 227, 228, 238, 240, 254, 255 and 272. C.I. pigment violet: 19, 23, 29, 30, 37, 40 and 50. C.I. pigment blue: 15, 15:1, 15:3, 15:4, 15:6, 22, 60 and 64. C.I. pigment green: 7 and 36. C.I. pigment brown: 23, 25 and 26. Of course the present invention is not limited to these.

(Dispersing Agent)

Any resin having water solubility can be used as a dispersing agent for dispersing the pigment above in an aqueous medium. Of these, a dispersing agent having a weight-average molecular weight of no less than 1,000 and no greater than 30,000 is preferred, and a dispersing agent having a weight-average molecular weight of no less than 3,000 and no greater than 15,000 is even more preferred. The amount of dispersing agent in the ink (mass %) is preferably no less than 0.1 mass % and no greater than 5.0 mass % of the total mass of the ink as a reference.

More specifically, the following, for example, can be used as the dispersing agent. A polymer having as monomers styrene, vinylnaphthalene, aliphatic alcohol ester of α, β-ethylene unsaturated carboxylic acid, acrylic acid, maleic acid, itaconic acid, fumaric acid, vinyl acetate, vinylpyrrolidone, acrylamide, or derivative of these. Preferably one or more of the monomers of the polymer is a hydrophilic monomer, and it is also possible to use a block copolymer, random copolymer, graft copolymer or salt of these. It is also possible to use a natural resin such as rosin, shellac and starch. Preferably, these resin are soluble in a solution in which a base has been dissolved, or in other words are alkali soluble.

(Surfactant)

In order to adjust the surface tension of the ink of an ink set, preferably a surfactant such as an anionic surfactant, nonionic surfactant and ampholytic surfactant is used. More specifically, it is possible to use polyoxyethylene alkyl ether, polyoxyethylene alkylphenol, acetylenic glycol compound, acetylenic glycol ethylene oxide adduct.

(Other Components)

In order to maintain moisture, the inks of the ink set can contain a type of moisturizing solid such as urea, urea derivative, trimethylolpropane and trimethylolethane. The amount of moisturizing solid that is contained in the ink (mass %) is preferably no less than 0.1 mass % and no greater than 20.0 mass % of the total mass of the ink as a reference, and more preferably no less than 3.0 mass % and no greater than 10.0 mass %. Moreover, in addition to components above, the inks of the ink set can contain as necessary various components such as a pH regulator, corrosion inhibitor, preservative, antimold agent, antioxidant, reduction prevention agent, and an evaporation accelerator.

Next, the ink used in this embodiment will be explained in more detail. Within the scope of the present invention, the invention is not limited by the following embodiment. In the following explanation, unless specially specified, the terms "parts" and "%" refer to mass.

(Preparation of Resin Solution A)

A styrene/acrylic acid random copolymer having an acid value of 200 mg KOH/g, and weight-average molecular weight of 10,000 was neutralized using potassium hydroxide to 1 chemical equivalent. After that, the resin density was adjusted to 10% using water, and the resin solution A was obtained.

(Preparation of Pigment Dispersing Liquid 1 to 4)

Pigment dispersing liquid 1 to 4 was prepared using the procedure given below.

<Preparation of Pigment Dispersing Liquid 1 Containing C.I. Pigment Red 122>

Ten parts pigment (C.I. pigment red 122), 20 parts resin solution A and 70 parts deionized water were mixed and dispersed for 3 hours using a batch-type vertical sand mill. After that, coarse particles were removed using centrifugation. Furthermore, pressure filtration was performed using a cellulose acetate filter (manufactured by Advantec) having a pore size of 3.0 μm, and pigment dispersing liquid 1, which has a pigment density of 10 mass %, was obtained.

<Preparation of Pigment Dispersing Liquid 2 Containing C.I. Pigment Blue 15:3>

Ten parts pigment (C.I. pigment blue 15:3), 20 parts resin solution A and 70 parts deionized water were mixed and dispersed for 5 hours using a batch-type vertical sand mill. After that, coarse particles were removed using centrifugation. Furthermore, pressure filtration was performed using a cellulose acetate filter (manufactured by Advantec) having a pore size of 3.0 μm, and pigment dispersing liquid 2, which has a pigment density of 10 mass %, was obtained.

<Preparation of Pigment Dispersing Liquid 3 Containing C.I. Pigment Yellow 74>

Ten parts pigment (C.I. pigment yellow 74), 20 parts resin solution A and 70 parts deionized water were mixed and dispersed for 1 hour using a batch-type vertical sand mill. After that, coarse particles were removed using centrifugation. Furthermore, pressure filtration was performed using a cellulose acetate filter (manufactured by Advantec) having a pore size of 3.0 μm, and pigment dispersing liquid 3, which has a pigment density of 10 mass %, was obtained.

<Preparation of Pigment Dispersing Liquid 4 Containing C.I. Pigment Black 7>

Ten parts pigment (C.I. pigment black 7), 20 parts resin solution A and 70 parts deionized water were mixed and dispersed for 3 hours using a batch-type vertical sand mill. The circumferential speed when dispersing was double that used when preparing pigment dispersing liquid 1. After that, coarse particles were removed using centrifugation. Furthermore, pressure filtration was performed using a cellulose acetate filter (manufactured by Advantec) having a pore size of 3.0 μm, and pigment dispersing liquid 4, which has a pigment density of 10 mass %, was obtained.

(Ink Preparation)

Each of the components given in FIG. 22 were mixed, and after sufficient stirring, pressure filtration was performed using a cellulose acetate filter (manufactured by Advantec) having a pore size of 0.8 μm, and inks 1 to 8 were prepared.

The ink composition, which is one feature of the present invention, will be described in detail in the explanation of the embodiments.

Embodiment 1

Figure 9:
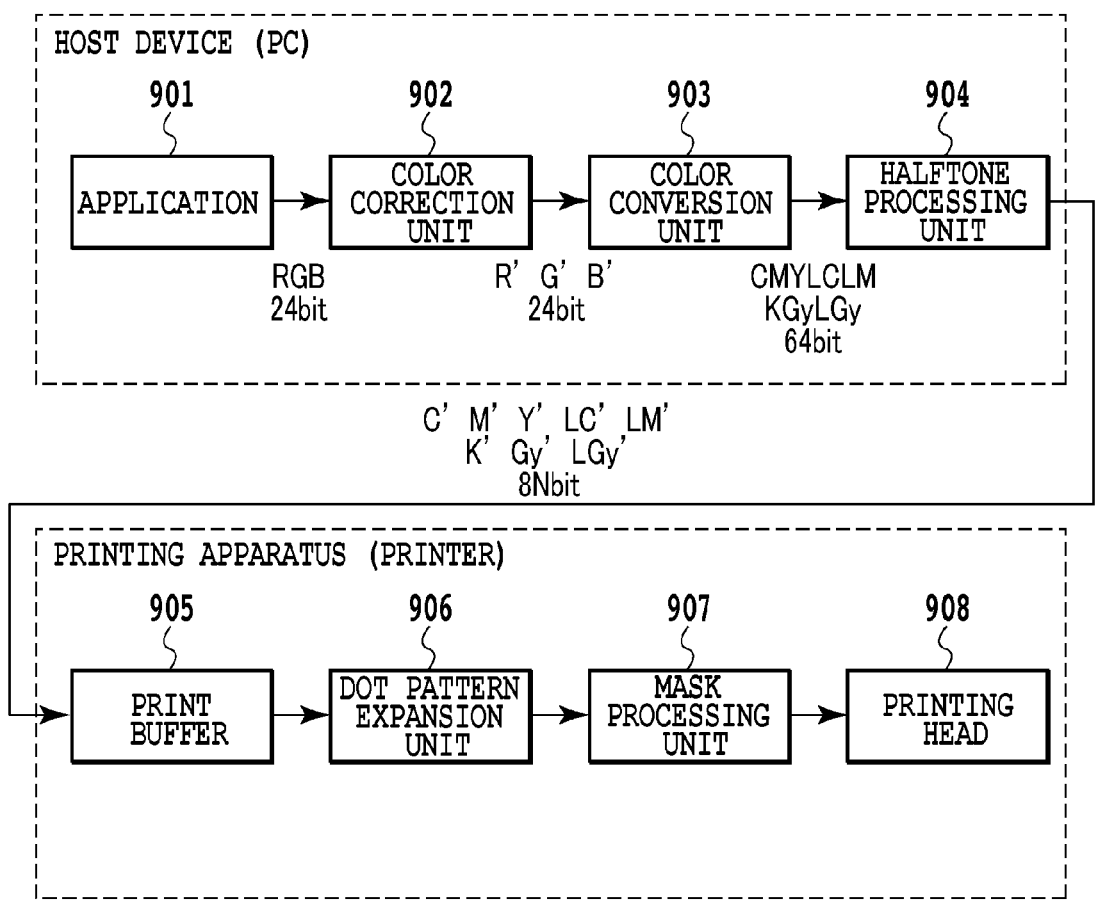
FIG. 9 is a block diagram illustrating the image processing configuration of an inkjet printer of the present invention.

In the following, a first embodiment of the present invention will be explained with reference to the accompanying drawings. FIG. 9 is a block diagram illustrating the configuration of image processing by the inkjet printer of the present invention.

In the figure, 901 is an application on a PC. From the application, image data having 8 bits each for RGB for a total of 24 bits is inputted to a color correction unit 902. The color correction unit 902 converts the input image data (RGB data) to differing R'G'B' data. Typically, a 3-dimensional look-up table (LUT) and a conversion process that uses interpolation are used for this color correction process. The LUT comprises a plurality of kinds of tables that correspond to the type of color correction, with the table used being appropriately set through user selection and application settings. For example, when a photograph is to be outputted, a photograph LUT is used, and when a graphic image is to be outputted, a graphics LUT is selected.

The 24-bit R'G'B' data that is outputted from the color correction unit 902 is inputted to a color conversion unit 903. The color conversion unit 903 converts the image data to an output signal (ink color data) that corresponds to the ink colors used by the inkjet printer (eight colors in this embodiment: C, M, Y, LC, LM, K, Gy, LGy). This output signal has 8 bits for each color, or in other words, is eight colors 64-bit output data. The contents of the conversion table used by this color conversion unit, which is a feature of this embodiment, will be described later.

In the figure, 904 is a halftone processing unit. Here, pseudo halftone processing such as error diffusion (halftoning process) is performed on the 8 bits for each color, which is a 256 value multi-value signal, and the data is converted to data having N values, which is less than 256 values. More specifically, the N values are 3 to 16 values for which to 4 bit multi-value halftoning is performed. In the explanation of this embodiment, multi-value halftoning is used, however the embodiment is not limited to this, and binary halftoning is also possible.

In FIG. 9, 905 is a print buffer. Processing up to the halftoning process is performed by a PC, and processing after that is performed by the printer, so N-value data for which halftoning was performed is stored from the host device (PC) in a print buffer 905.

In the figure, 906 is a dot pattern expansion unit. The dot pattern expansion unit 906 expands the N-value data that was inputted from the print buffer 905 to corresponding dot patterns of N types of gradations, and creates 2-value printing data that sets in pixel units whether or not ink is ejected. An example of this dot pattern expansion is explained using FIG. 10. The example in FIG. 10 is an example of expanding 5-value data that was inputted to a 2×2-pixel dot pattern. Pixels that are filled in with black are dots that are ON and white pixels are dots that are OFF.

Figure 11:
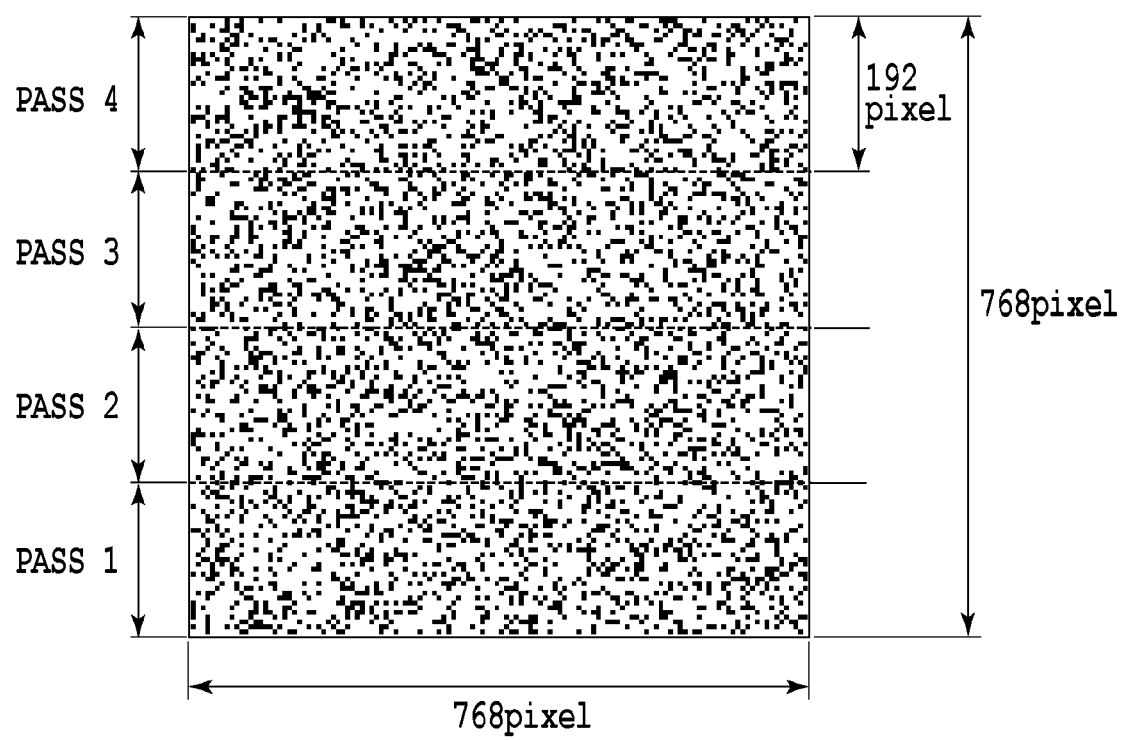
FIG. 11 is a diagram explaining mask patterns used in multi-pass printing.

In FIG. 9, 907 is a mask processing unit. In a multi-pass printing process in which printing data that is to be printing in the common image area is divided into a plurality of scans and printed, this unit performs a mask process that uses thinning patterns (hereafter called mask patterns). FIG. 11 is a diagram for explaining a typical mask pattern. The mask pattern in FIG. 11 is an example of a 4-pass mask pattern for when printing is completed in four scans. In this mask pattern, pixels that are ON in each pass are indicated by black dots, and pixels that are OFF are indicated by white dots, with the dots being arranged in a random arrangement. The vertical and horizontal size in pixels is 768×768 pixels, with the nozzle array direction of the printing head being indicated along the vertical direction, and the main scanning direction in which the printing head scans being indicated along the horizontal direction. Furthermore, the pixel size 768 in the vertical direction corresponds to 768 nozzles, which is the number of nozzles of the printing head. As indicated by the dotted lines in the figure, when the 768 pixels in the vertical direction are divided by four into 192 pixels, the mask pattern becomes mask patterns for passes 1 to 4, and these mask patterns for passes 1 to 4 are in an interpolated relationship. In this example, the mask patterns for passes 1 to 4 have nearly the same duty, or in other words a 25% duty.

Figure 12:
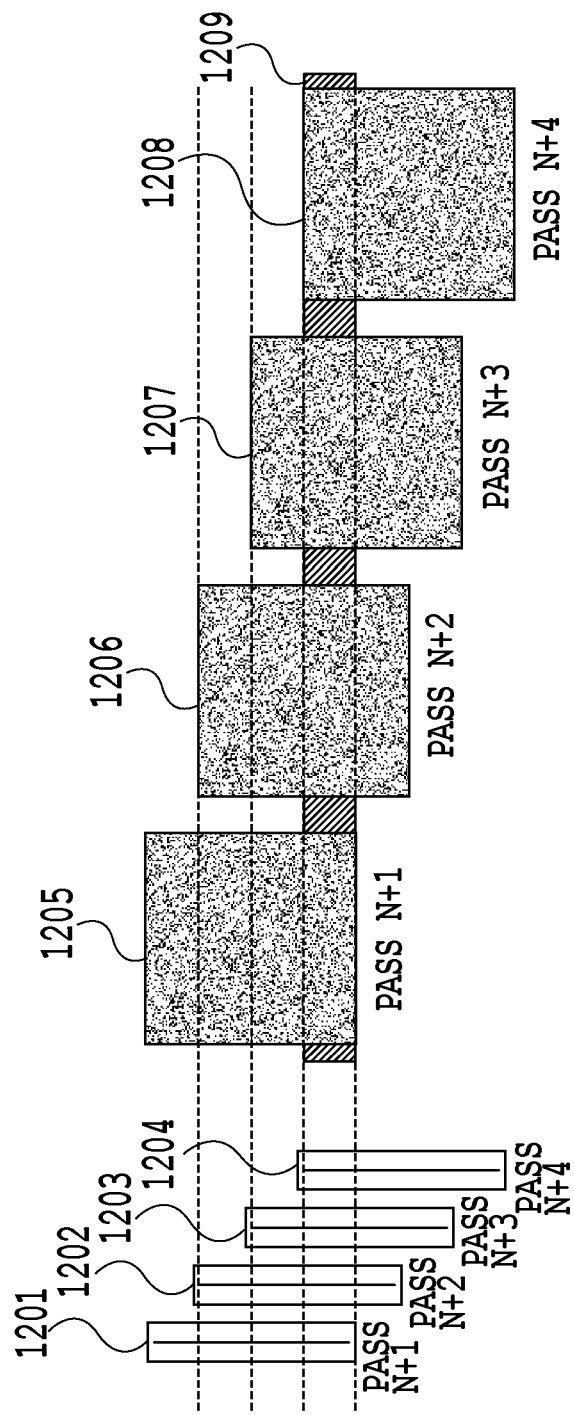
FIG. 12 is a diagram explaining multi-pass printing processing that uses the mask pattern explained in FIG. 11.

FIG. 12 is a diagram for explaining the multi-pass printing process that prints printing data that have been divided using the mask pattern in FIG. 11. In FIG. 12, 1201 to 1204 are printing heads (in this figure, for simplicity, the printing heads of one color will be explained), and when performing 4-pass multi-pass printing, the printing paper is sequentially conveyed by a conveying mechanism not illustrated in the figure; the figure illustrates a state in which the positions of the heads are shifted relative to the same area of the printing paper. In the multi-pass printing process, the method of generating printing data that corresponds to a plurality of scans is not limited to a form of dividing the data using a mask pattern as described above. For example, it is possible for the dot pattern expansion unit to create printing data that corresponds to a plurality of scans by the dot pattern having a function of setting whether or not to eject ink in the dot pattern, as well as a function of specifying which scan to print ejected ink.

Here, the ink composition, which is one feature of this first embodiment, will be explained.

FIG. 23 illustrates the relationship between the density of the pigment coloring material and the density of resin of light gray ink as a first achromatic color, gray ink as a second achromatic color and black ink as a third achromatic color. The density (mass %) of the coloring material of black ink, gray ink and light gray ink is 3.0%, 1.0% and 0.5%, respectively. The optimum coloring material density differs according to the type of coloring material used and the ejection amount of the printing head; however, can be adjusted from the graininess in highlighted areas, and in halftone and shadow areas, from the graininess and gradation in transitioning areas where the ink switches from light ink to dark ink. Moreover, as illustrated in FIG. 23, the density of resin for black ink and gray ink used in this embodiment is 0.8%, whereas the resin density for light gray ink becomes larger and is 3.0%. Black ink and gray ink have a relatively high pigment density, so by adding more resin, smoothness decreases. Therefore, negative effects occur due to a decrease in glossiness, and thus it is not possible to increase the amount of resin by much. On the other hand, the pigment density of light gray ink is low, and naturally has high glossiness, and because there is no fear of the glossiness decreasing much even though the amount of resin is increased, the amount of resin added is optimized according to the density of pigment as illustrated in FIG. 23. As long as the densities of resin for black ink and gray ink are less than the density of resin for light gray ink, the densities may be different. The relationship between the pigment density and glossiness is disclosed in the Journal of the Imaging Society of Japan, Vol. 43, No. 6 (2004), "Development of Pigment Inkjet Ink the Excels in Glossiness", so that details will be omitted here.

Figure 13:
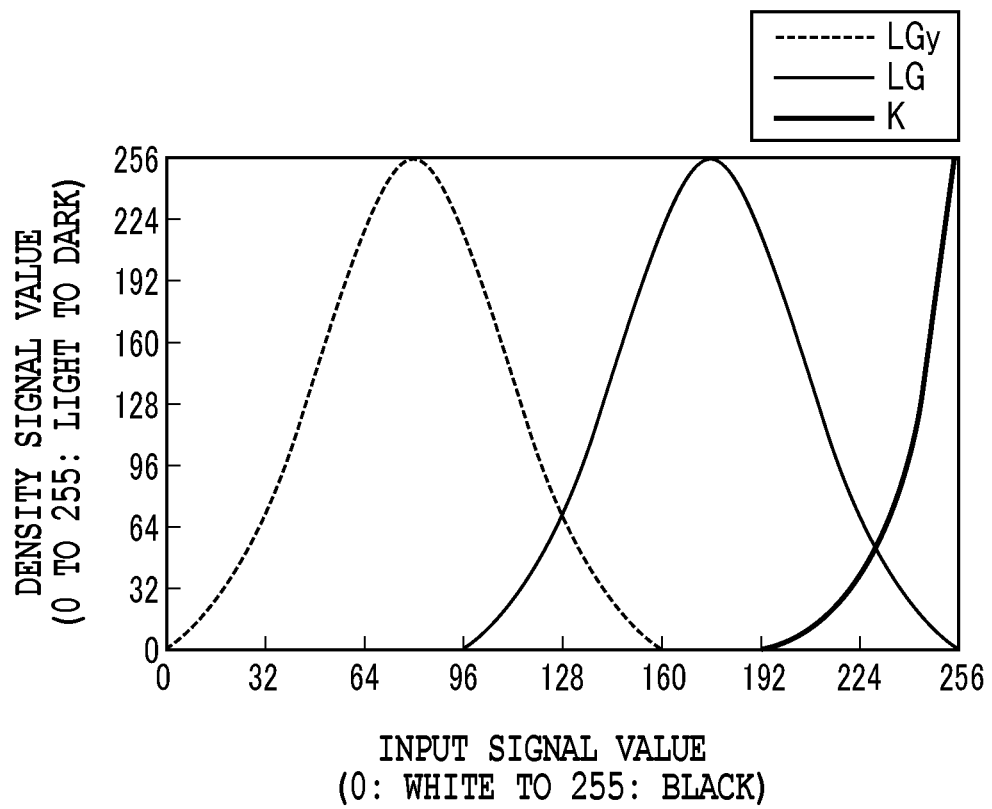
FIG. 13 is a diagram illustrating the relationship between an input signal and the amount of ink in a gray line of a conventional color conversion table.

Next, the characteristic color conversion table used in this embodiment will be explained. First, before that, a detailed example of a conventional color conversion table will be explained using FIG. 13. FIG. 13 is a diagram that illustrates the relationship between the value of input image, data of achromatic colors, for which the R'G'B' signals have equivalent values and the output values of ink color data that indicates the amount of ink to be used. In FIG. 13, the value of the input density signal of the grayline that connects from white to black is given along the horizontal axis, the relationship between the amount of ink of each color with respect to the input values is given along the vertical axis, and to simplify the explanation, only the three achromatic colors of ink, black (K), gray (Gy) and light gray (LGy) are illustrated. Actually, achromatic colors also have some color component, so a small amount of chromatic ink is mixed in order to adjust the tone to an achromatic color. The horizontal axis in FIG. 13 indicates the input signal (0: white, 255: black) (achromatic color axis), and the vertical axis indicates the output density signal (0 to 255: light to dark). In order to reduce the graininess of dots in highlighted areas where the value of the input signal is small, or in other words, in areas that include the lowest density of white, light gray having the lowest ink density is used. As the value of the input signal increases, the amount of light gray increases, and the reproducible image density also increases, however, there is a limit to the density that can be reproduced using light gray, so during this process, gray ink having higher ink density is also used. At this time, by adding gray ink, the total amount of ink also increases, and since there is a limit to the amount of ink that the printing medium can receive, normally, as the amount of ink having a high ink density increases, the amount of ink having a low ink density is reduced and replaced. Similarly, as the value of the input signal increases, ink is replaced from gray ink to black ink, and when the value of the input signal is the maximum value of 255, only black ink is used.

Next, a grayline using this table is printed in a graph of the grayline using the conventional color conversion table in FIG. 13, and the bronzing values measured by the bronzing quantifying method described above are illustrated in FIG. 14. The bronzing values are calculated from $\sqrt{(a^{*\wedge}2+b^{*\wedge}2)}$ using the a*b* components of the L*a*b* values of the regular reflection given by Equation 8, and correspond to the saturation (C*) of the bronze color. As can be seen from FIG. 14, bronzing of the low side of the input signal value, or in other words, the highlight side that includes white, is kept relatively low. On the other hand, bronzing from the halftone area to the high-density area side that includes the maximum density is relatively large, and exceeds the bronzing OK line. In this embodiment, the bronzing OK line is a border where, when observing printed matter, the bronzing phenomenon is not seen at all, or where it is seen but the quality is allowed.

Figure 15A:
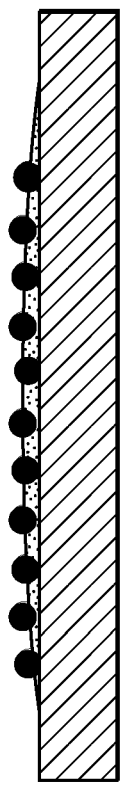
FIGS. 15A and 15B are diagrams schematically illustrating the state of pigment coloring material and resin on a printing medium when pigment ink is fixed to a printing medium.
Figure 15B:
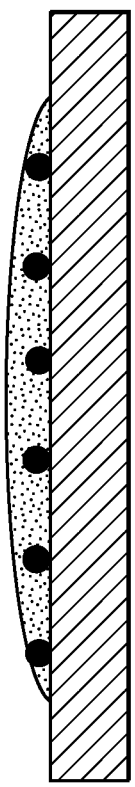

The reason that the phenomenon occurs in which the level of bronzing differs according to the gradation is explained with reference to FIGS. 15A and 15B. FIGS. 15A and 15B schematically illustrate the state of pigment coloring material and resin, which are contained in ink, on a printing medium after the ink has hit and is fixed to the printing medium. FIG. 15A is a diagram that schematically illustrates the fixed state of pigment coloring material and resin, which are contained in light gray ink, when printing the light gray ink that is used in this embodiment on a printing medium. On the other hand, FIG. 15B is a diagram that schematically illustrates the fixed state of pigment coloring material and resin, which are contained in each ink, when printing the gray ink and black ink of this embodiment on a printing medium. As can be seen from comparing FIG. 15A and FIG. 15B, there is a large amount of resin in the light gray ink in FIG. 15A, and that resin entirely covers the pigment coloring material when fixed on the printing medium; however, in FIG. 15B, there is a smaller amount of resin, so a large percentage of pigment coloring material is exposed on the surface of the printing medium.

Figure 14:
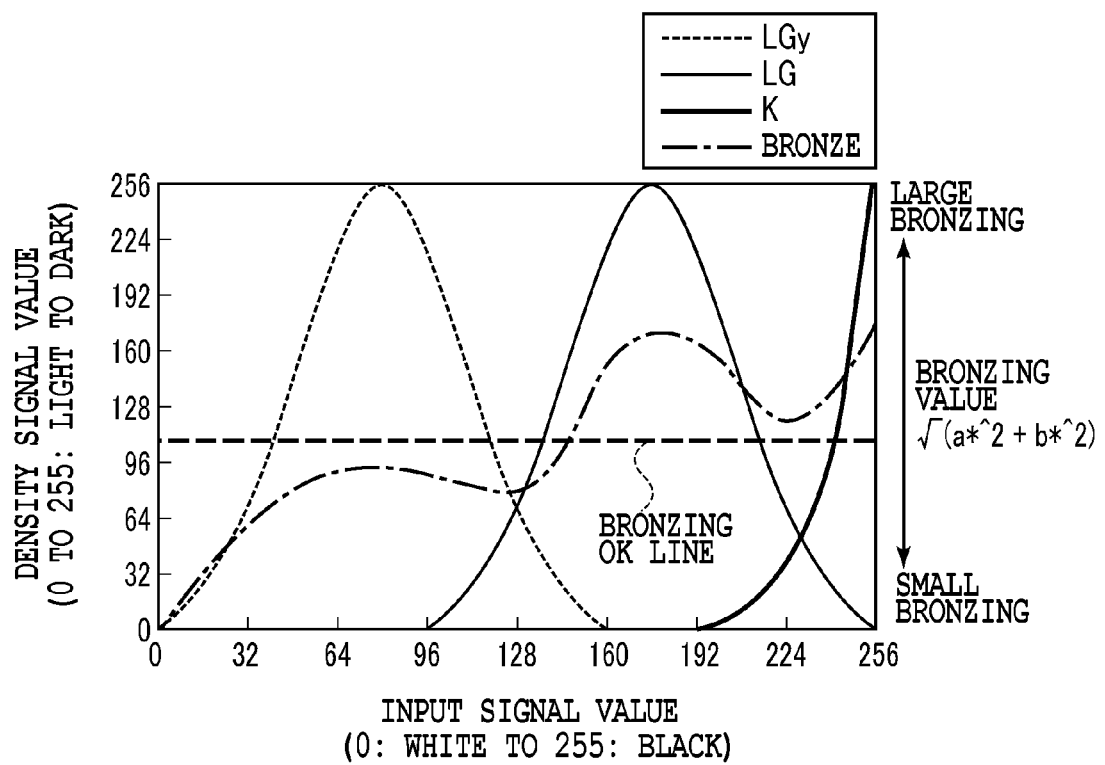
FIG. 14 is a diagram illustrating the bronze value when the color conversion table of FIG. 13 is used.

Therefore, it is easier for the bronzing phenomenon to occur in the gray ink and black ink in FIG. 15B than in the light gray ink in FIG. 15A, so as illustrated in FIG. 14, bronzing becomes more easily noticeable in areas of gradation where gray ink and black ink are used more.

The reason for changing the amount of resin used depending on the density of coloring material of the ink will be explained. Generally, a characteristic of ink having a relatively high density of pigment coloring material (black ink and gray ink in this embodiment) is that unevenness easily occurs on the paper surface when the ink is fixed, and it becomes easy for diffused reflection of light to occur on the printed surface, so it is easy for a decrease in glossiness to occur. On the other hand, in ink having a low density of pigment coloring material, it is difficult for unevenness to occur on the paper surface, and thus it is difficult for diffused reflection of light to occur on the printed surface. Moreover, generally, unevenness also occurs on the paper surface due to resin that is used in the pigment ink remaining on the paper surface. Therefore, the amount of resin contained is changed according to the density of pigment coloring so that the glossiness is constant for each density of coloring material of ink.

By changing the amount of resin contained in the black ink, gray ink and light gray ink, it is possible to keep the glossiness uniform over all gradations; however a problem occurs in that the bronzing phenomenon becomes noticeable in areas of high density.

Figure 16:
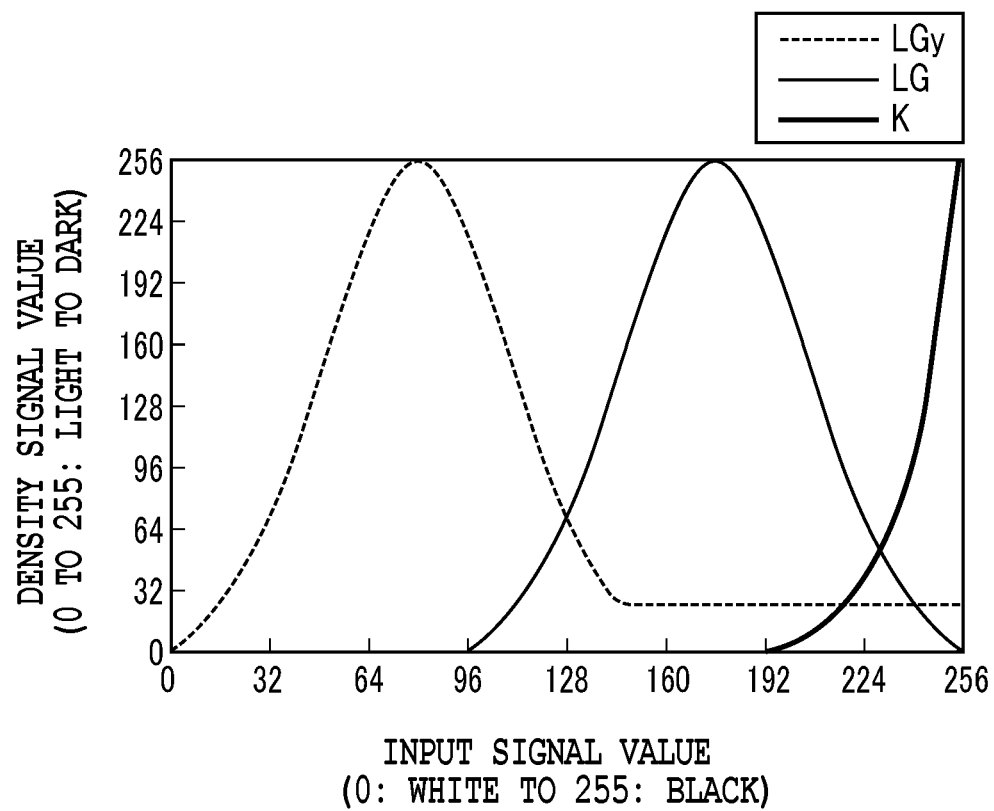
FIG. 16 is a diagram explaining the relationship between an input signal and amount of ink in a gray line of a color conversion table used in a first embodiment of the present invention.

Therefore, in this embodiment, bronzing is reduced by using a fixed amount of light gray ink having a high density of resin up to areas of high density. FIG. 16 illustrates an example of a color conversion table that sets the method of using that ink. When compared with the conventional color conversion table in FIG. 13 described above, the amount of light gray ink was nearly "0" near the input signal value of 160; however, in FIG. 16, the amount was kept nearly constant up to the high-density range.

Furthermore, in this embodiment, the occurrence of bronzing is suppressed by printing light gray ink in scanning after the other black ink and gray ink. This printing method will be described below.

In this embodiment, as was explained in FIG. 9, an image is printed using multi-pass printing that prints in the common image area by performing a plurality of scans. Mask processing, which uses mask patterns for dividing printing data into a plurality of scans, is performed, however, by changing the mask patterns that are used for each ink, it is possible to print with light gray ink in later scans after the other ink colors.

Figure 17A:
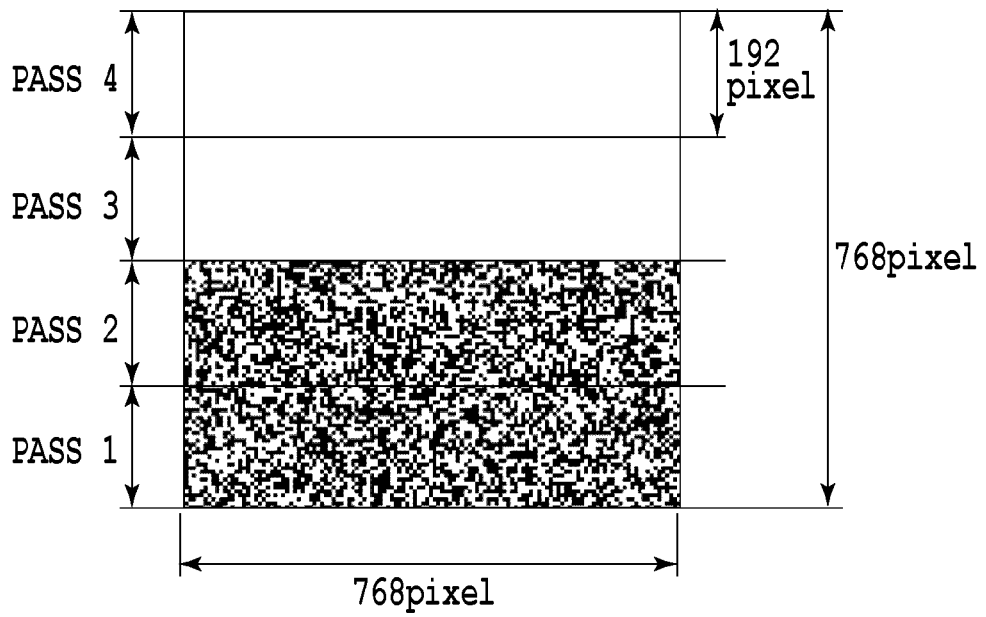
FIGS. 17A and 17B are diagrams explaining mask patterns for each ink color that are used in a first embodiment.
Figure 17B:
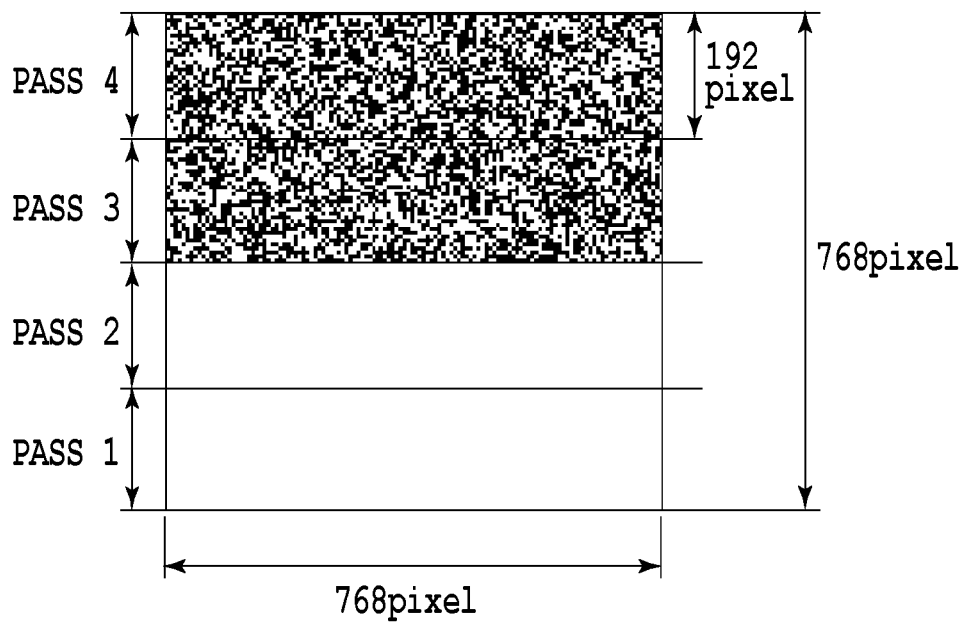

An example of mask patterns that are used for black ink and gray ink is illustrated in FIG. 17A, and an example of mask patterns that are used for light gray ink are illustrated in FIG. 17B. In this embodiment, printing is performed using 4-pass multi-pass printing, so in the first and second pass black ink and gray ink are printed in the pixel positions for which the dots in the mask patterns (FIG. 17A) are ON (black). In the third pass and fourth pass, light gray ink is printed in pixel positions where the dots in the mask patterns (FIG. 17B) are ON (black). Therefore, in both FIGS. 17A and 17B, in passes where the dots are ON, printing is performed at a 50% printing duty. The printing duty is the percentage of pixels of all of the pixels in the common image area for which ink dots are printed, and is set according to the mask patterns above.

Next, how the mask patterns illustrated in FIGS. 17A and 17B are used in multi-pass printing will be explained using FIGS. 21A and 21B.

In FIGS. 21A and 21B, from 2101 to 2104 are printing heads (in this figure, for simplification, printing heads for one color are explained), and the figures illustrate the case in which when performing 4-pass multi-pass printing, the printing paper is sequentially conveyed by a conveying mechanism (not illustrated in the figure) and the position of the printing heads shifts relative to the same area of the printing paper. FIG. 21A illustrates an example of multi-pass printing that uses mask patterns for printing the black ink and gray ink in FIG. 17A, and FIG. 21B illustrates an example of multi-pass printing that uses mask patterns for printing the light gray ink in FIG. 17B. In FIG. 21A, the first half of the image is formed by two passes, pass N+1 and pass N+2, and in FIG. 21B, the remaining half of the image is formed by two passes, pass N+3 and pass N+4.

Figure 18A:
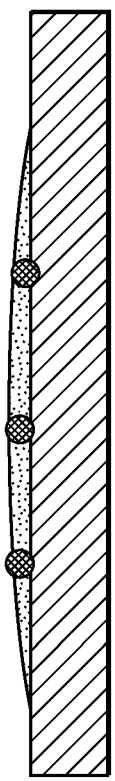
FIGS. 18A to 18D are diagrams schematically illustrating the state of pigment coloring material and resin on a printing medium when pigment ink is printed using the method of the first embodiment.
Figure 18B:
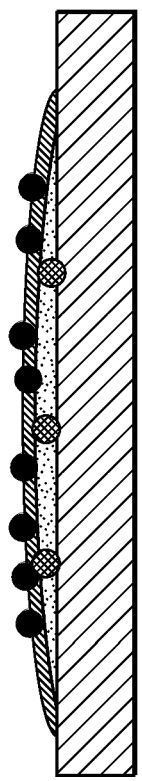

FIGS. 18A to 18D schematically illustrate the state on the printing medium of the pigment coloring material and resin contained in the ink after the ink has hit the printing medium according to this embodiment as described above. FIG. 18A illustrates the state in which the pigment coloring material and resin of black ink and gray ink are fixed on the paper surface, and FIG. 18B illustrates the state in which the pigment coloring material and resin of light gray ink are fixed on the paper surface. (In order that the explanation is easily understood, the particles of pigment coloring material included in black ink and gray ink are indicated in black. On the other hand, particles of pigment coloring material included in light gray ink are distinguished by being indicated using cross hatching; however, that does not mean that the type of coloring material used is different. Also, similarly, the resin that is included in black ink and gray ink is distinguished by being indicated using hatching, however, that does not mean that the type of resin differs from the resin included in light gray ink illustrated in FIG. 18B.)

As described above, in the case of the black ink and gray ink in FIG. 18A, the amount of resin contained in the ink is small, so that pigment coloring material is partially exposed on the surface of the printing medium, and bronzing occurs easily in this state. On the other hand, the light gray ink in FIG. 18B has a large amount of resin as described above, so that coloring material is not exposed on the surface, and it is difficult for bronzing to occur. Therefore, after printing black ink and gray ink on the paper surface, gray ink is printed in subsequent scans. As a result, as illustrated in FIG. 18C, a film that covers the coloring material that is included in the black ink and gray ink is formed by the large amount of resin that is included in the light gray ink.

In other words, in pass N+1 and pass N+2 in FIG. 21A, black ink or gray ink is printed, and light gray ink is printing in pass N+3 and pass N+4 in FIG. 21B. Therefore, light gray ink is printed over the black ink or gray ink that is fixed on the printing medium, and it is possible to form a film of resin covers the coloring material as in FIG. 18C.

Figure 18C:
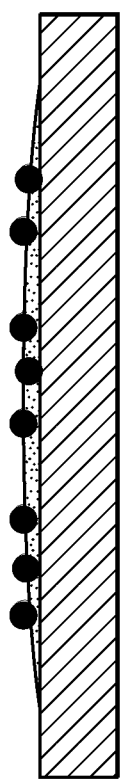
Figure 18D:

For comparison, FIG. 18D on the other hand, schematically illustrates the film formation state in the case of printing light gray ink first, and then in subsequent scans printing black ink and gray ink. As a result, the coloring material that is included in the black ink and gray ink remains on the top of the film that is formed of resin that is contained in the light gray ink, so that it does not contribute to the covering of the coloring material by the resin of the light gray ink, and thus a fixed amount of coloring material is exposed on the printed surface, and it becomes easy for bronzing to occur.

When the black ink or gray ink is printed in the same scan as light gray ink using a typical multi-pass printing method such as illustrated in FIG. 12 instead of the method illustrated in FIGS. 21A and 21B, the states of the film illustrated in FIGS. 18C and 18D become somewhat mixed. Therefore, in order to suppress the bronzing phenomenon, printing light gray ink in subsequent scans as illustrated in FIGS. 21A and 21B is very effective.

One more reason for printing light gray ink in subsequent scans will be explained. After the large amount of resin that is contained in light gray ink has become fixed to the paper surface and then a different ink is printed on top of that resin, a phenomenon occurs in which the resin prevents moisture or solvent in the ink from entering into spaces that absorb ink in the ink receptive layer of the printing medium. As a result, it becomes easy for the ink to overflow. In order to avoid this, the total amount of ink must be reduced, which has an adverse effect on the image, such as a decrease in coloring characteristics. Therefore, by printing light gray ink, having a large amount of resin that prevents penetration as described above, in subsequent scan as much as possible, it becomes more difficult for penetration to be prevented, and thus there is no need to reduce the total amount of ink. As a result, it is possible to maintain image quality and suppress the occurrence of the bronzing phenomenon.

In this embodiment, the passes for printing black ink and gray ink and the passes for printing light gray ink are completely separated; however, in part of the passes it is also possible to overlap black ink and gray ink with light gray ink. For example, it is possible to print black ink and gray ink in passes 1 to 3 with a printing duty of 40%, 40% and 20%, and to print light gray ink in passes 2 to 4 with a printing duty of 20%, 40% and 40%. That is, in this embodiment, black ink as a third achromatic ink and gray ink as a second achromatic ink are printed in the first half of the scans of a plurality of scans, and light gray ink as a first achromatic ink is printed as much as possible in the latter half of scans. In other words, for black ink and gray ink, the total printing duty for the first half of scans is higher than the total printing duty of the latter half of scans. Moreover, for light gray ink, the total printing duty for the latter half of scans is higher than the total printing duty for the first half of scans.

Figure 19:
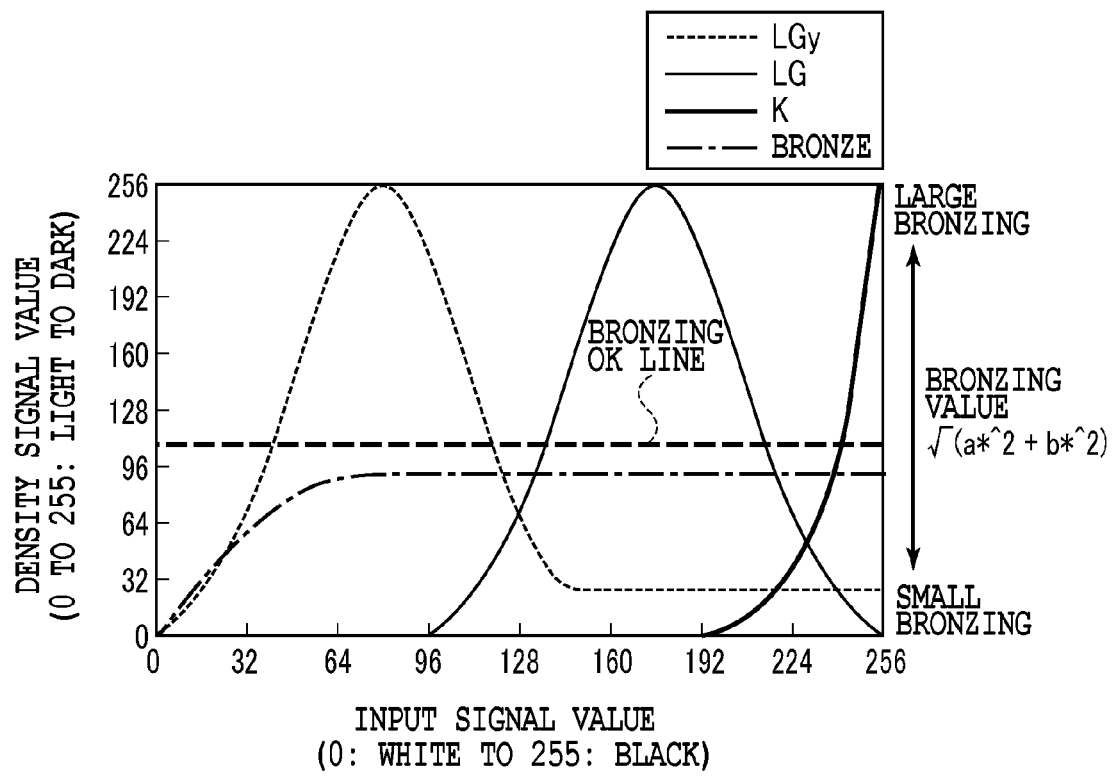
FIG. 19 is a diagram illustrating the bronzing value of a printed surface when printed according to the first embodiment.

FIG. 19 illustrates a state in which the bronzing value ($\sqrt{(a^{*2}+b^{*2})}$) has been reduced by using light gray ink in all density ranges except the case where the input signal value is a minimum value (zero), and gray ink is printed only in the latter half of the scans.

In this embodiment, a larger amount of resin is contained in light gray ink than in gray ink and black ink. Also, a fixed amount or greater of this light gray ink is used in all gradations except for the lowest output value (zero). As a result, it is possible to effectively suppress the bronzing phenomenon, and keep deterioration in image quality caused by a decrease in glossiness and chromogenic characteristics to a minimum.

Embodiment 2

Next, a second embodiment of the present invention is explained. In this embodiment, instead of using light gray ink in all areas of input signal values, light gray ink is limited to use in only areas where black ink is first used and the input signal value is a specified value or less.

FIG. 24 illustrates the relationship between the pigment density and the amount of resin in the black ink and gray ink, and in light gray ink that are used in this embodiment. The pigment density and resin amount of gray ink and light gray ink is the same as in the first embodiment; however, the pigment density of black ink is increased from 3.0% to 4.0%.

Figure 20A:
FIGS. 20A to 20D are diagrams illustrating the difference in the uneven surface state of a printing medium when ink having different densities of pigment coloring material are used in a second embodiment of the invention.
Figure 20B:
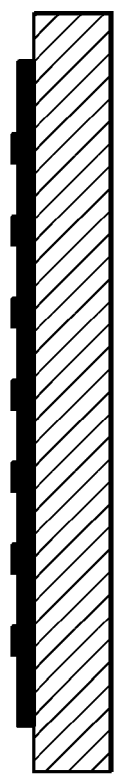

FIGS. 20A to 20D are diagrams that schematically illustrate the state of ink dots having the pigment densities and resin amounts above fixed on the paper surface. FIG. 20A schematically illustrates the state of gray ink dots fixed on the paper surface, and FIG. 20B schematically illustrates the state of black ink dots fixed on the paper surface. As can be seen in FIGS. 20A and 20B, the height of the dots of both inks from the paper surface is high, with the height of black ink dots being the highest. More specifically, the height in FIG. 20A is approximately 100 nm, and the height in FIG. 20B is nearly double that at approximately 200 nm. The reason that the dot heights of the single dots differ is because the densities of the pigment coloring material that is contained in the inks differ, with the density of the pigment of black ink being higher.

Figure 20C:
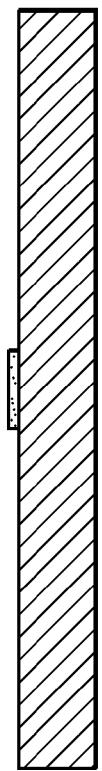
Figure 20D:
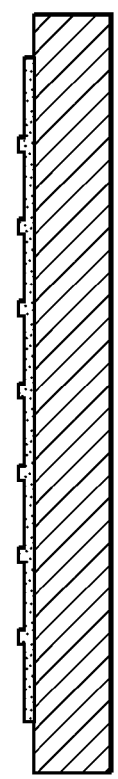

FIGS. 20C and 20D illustrate states in which the dots illustrated in FIGS. 20A and 20B are printed with a duty such that the dots completely cover the paper surface. In FIG. 20A, there is only a single dot, so an uneven gap occurs at the edges of the dot, however, in FIGS. 20C and 20D, dots overlap each other, so that the dots are raised even more in overlapping areas, causing unevenness. For the gray ink in FIG. 20A, the height of the single dot is not so high, so the unevenness in the portions where the dots overlap in FIG. 20C is not so large. However, for the black ink in FIG. 20B, the height of a single dot is high, so that as illustrated in FIG. 20D, the unevenness in portions where the dots overlap becomes large.

By unevenness occurring on the printed surface such as illustrated in FIGS. 20C and 20D, the glossiness of both inks is different, with the glossiness of the black ink being lower than the glossiness of the gray ink. As described in the description of the method for evaluating bronzing, when there is relatively large surface unevenness in a state in which the printed surface is relatively rough, there is an advantage in that it becomes easy for regular reflected light to become diffused on the surface, and thus the intensity of the regular reflected light decreases and bronzing becomes less noticeable.

Figure 25A:
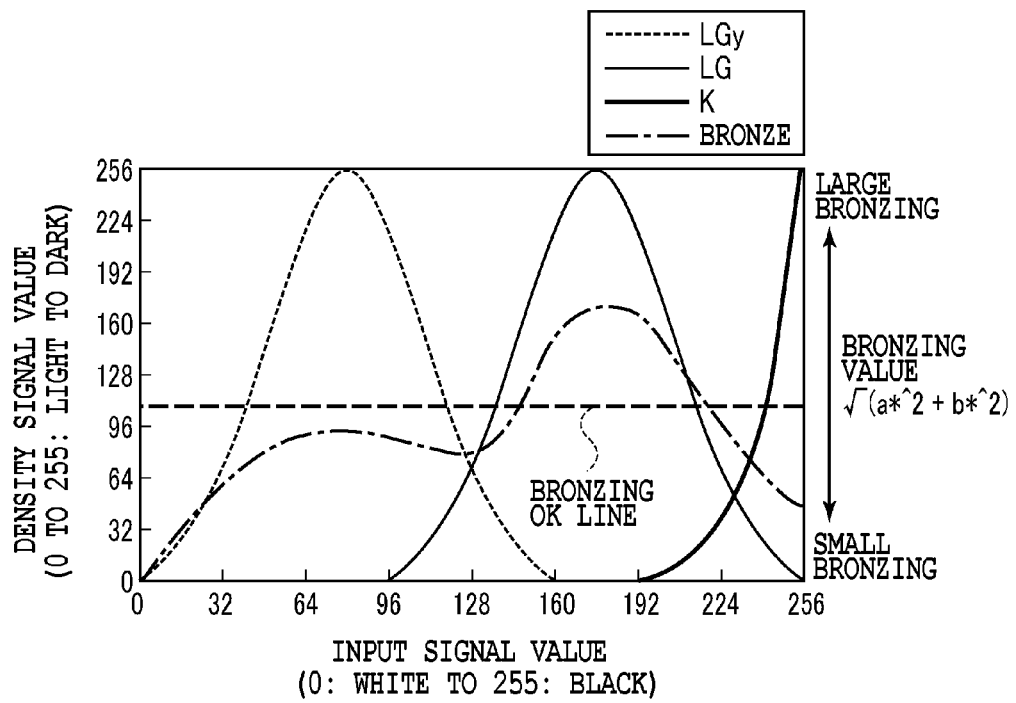
FIG. 25A is a diagram illustrating an example of a conventional color conversion table, and the bronzing values when that color conversion table is used.

A color conversion table that sets a combination of ink for forming a gray line that connects from white to black using black ink, gray ink and light gray ink having the characteristics above and that has table construction created using a conventional method is illustrated in FIG. 25A along with the relationship of bronzing values in this case. It can be seen that in gradation areas where a large amount of gray ink is used, and more specifically, in areas where the input signal value is from 144 up to 224, the bronzing value is large and exceeds the bronzing OK line, however, in gradation areas where black ink is used, or more specifically, in gradation areas where the input signal value is 224 or greater, the bronzing value is low, and clears the bronzing OK line.

Figure 25B:
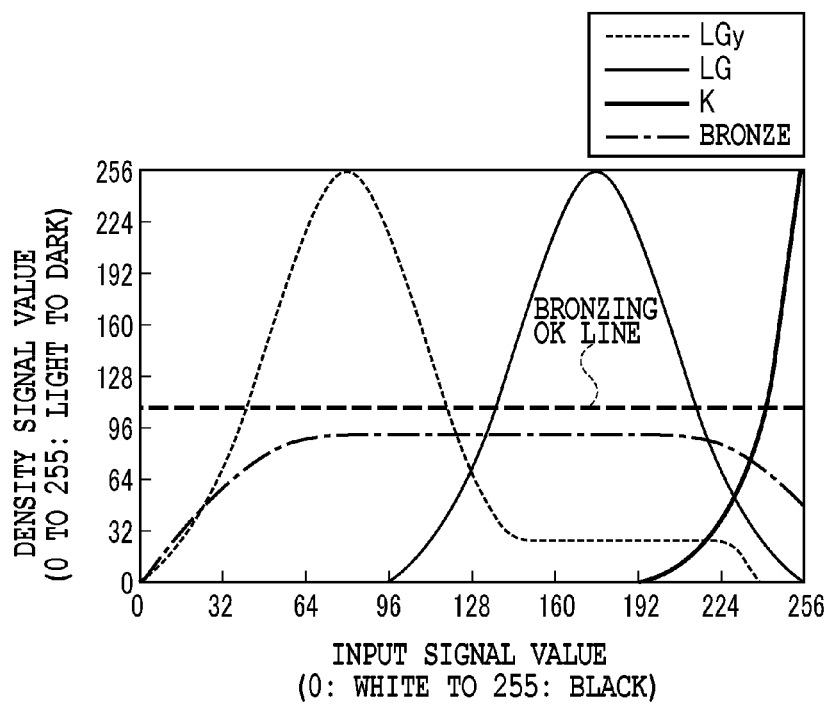
FIG. 25B is a diagram illustrating an example of a color conversion table of the second embodiment of the present invention, and the bronzing values when that color conversion table is used.

Next, the construction of a color conversion table, which is a feature of this embodiment, and the bronzing values when using that color conversion table are illustrated in FIG. 25B. In the conventional color conversion table in FIG. 25A, in the gradation areas where the bronzing value is large, or in other words, in the areas where the input signal value is from 144 up to 244, light gray ink is printed at a fixed amount. That is, light gray ink is used in the range up to specified value (224) that is larger than the value (192) where black ink is first used. In the conventional color conversion table in FIG. 25A, in gradation areas where the bronzing value is relatively low, or in other words, in gradation areas where the input signal value is 224 or greater, the amount of light gray ink used is gradually reduced, and hardly any is used.

In the construction of the color conversion table in FIG. 25B, by using light gray ink, in which a large amount of resin is contained and which is highly effective in suppressing bronzing, in a range up to a specified value (224) that is greater than the value (192) where black ink is first used, light gray ink is used only in locations where bronzing must be suppressed, so that it is possible to efficiently suppress the bronzing effect while maintaining image quality such as glossiness.

Other Embodiments

In the first and second embodiments above, a host device performs the image processing illustrated in FIG. 9 up to processing 904, and a printer performs processing after that. However, construction is also possible in which all of the image processing is performed by one device, either the host device or printer.

In the first and second embodiments of the present invention, a feature of changing the resin amount of a plurality of achromatic inks having different densities of coloring material according the densities of coloring material was described; however, the ink is not necessarily limited to achromatic ink. The present invention can similarly be adapted to a light and dark ink system or a light on dark ink system that uses cyan or magenta type ink such as is normally used as chromatic ink. However, in the case of embodying the present invention using other hues, it is obviously necessary to take steps such as adjusting the amount of ink used by reducing as much as possible the amount of coloring material contained in the ink, or taking into consideration the balance between the amount of ink used and the amount of bronzing to reduce, in order that the coloring material of the ink containing large amounts of resin does not affect the reproduction of colors that are to be produced. The coloring material used for the ink is not limited to pigment, and dyes can also be used.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-194742, filed Aug. 31, 2010, which is hereby incorporated by reference herein in its entirety.

What is claimed is:

1. An image processing method, comprising the steps of:
converting input image data to ink color data corresponding to each amount of a plurality of colors of inks used for printing, the plurality of colors of inks including at least a first achromatic ink, a second achromatic ink having a higher printing density and a lower resin density than the first achromatic ink, and a third achromatic ink having a higher printing density than the first and second achromatic inks and a lower resin density than the first achromatic ink; and
generating printing data for the first, second and third achromatic inks based on the ink color data, the printing data being used for printing by causing a printing head to scan a common image area in a printing medium a plurality of times, the printing head ejecting the plurality of colors of inks, wherein
the converting step comprises converting the input image data to ink color data for the first, second and third achromatic inks so that the first achromatic ink is used with respect to a value of the input image data indicating achromatic color, the value being greater than a lower limit in a range where the third achromatic ink is used; and
the generating step comprises generating the printing data for the first, second and third achromatic inks so as to (a) make a printing duty for the first achromatic ink during first half of the plurality of scans higher than a printing duty for the first achromatic ink during the latter half of the plurality of scans, and (b) make printing duties for the second and third achromatic inks during the latter half of the scans higher than in the first half of the scans, respectively.

2. The image processing method according to claim 1, wherein the converting step comprises converting the input image data to ink color data for the first, second and third achromatic inks so that the first achromatic ink is used with respect to a value of the input image data indicating achromatic color, the value of the input image data is within an entire range where the third achromatic ink is used.

3. The image processing method according to claim 1, wherein the generating step comprises generating printing data so that scans for printing using the first achromatic ink is performed after the scans for printing using the second and third achromatic inks.

4. The image processing method according to claim 1, wherein the generating step comprises using mask patterns so as to divide generated data indicating ejection of ink based on the ink color data, thereby generating printing data corresponding to the plurality of scans.

5. The image processing method according to claim 1, wherein the second and third achromatic inks have substantially the same resin density to each other.

6. The image processing method according to claim 1, wherein the first achromatic ink comprises light gray ink, the second achromatic ink comprises gray ink and the third achromatic ink comprises black ink.

7. The image processing method according to claim 1, wherein the first, second and third achromatic inks comprise pigment coloring material.

8. An image processing apparatus comprising:
a determination unit configured to determine ejection amounts of a first ink, a second ink having a higher printing density than that of the first ink and a lower resin density than the first ink, and a third ink having a higher printing density than that of the first ink and that of the second ink and a lower resin density than that of the first ink to a printing medium based on an image data for printing an image using a printing head for ejecting the first ink, the second ink, and the third ink, with each of the first, second and third inks being an achromatic pigment ink,
wherein, when printing at least a part of gradations in a gradation area of the image data for ejecting the third ink, the determination unit determines the ejection amounts so as to eject a first ink to the printing medium; and a control unit configured to cause the printing head to eject the ink according to the amounts of the first, second, and third inks determined by the determination unit.

9. The image processing apparatus according to claim 8, wherein, when printing all gradations in a gradation area of the image data for ejecting the third ink to a unit area of the printing medium, the determination unit determines the ejection amounts so as to eject the first ink to the printing medium.

10. The image processing apparatus according to claim 8, wherein the second ink and the third ink have equal resin densities.

11. The image processing apparatus according to claim 8, wherein, in printing a gray line image, the gradation area of the image data for ejecting the third ink to a unit area of the printing medium has a gradation having a density higher than that of the gradation in which the ejection amount of the first ink is the maximum.

12. The image processing apparatus according to claim 11, wherein, when printing a part of gradations in a gradation area of the image data for ejecting the third ink to the unit area, the determination unit determines the ejection amounts so as to eject the first ink and the second ink to the printing medium, and to eject the first ink in an amount that is less than the maximum and more than the amount of the second ink.

13. The image processing apparatus according to claim 8, wherein the first ink is a light gray ink, the second ink is a gray ink, and the third ink is a black ink.

14. The image processing apparatus according to claim 8, further comprising a control unit configured to control the printing head and a scan unit in such a manner that: with a relative scan of the printing medium and the printing head by the scan unit, the first ink, the second ink, and the third ink are ejected; printing is performed by a plurality of the scans to a unit area of the printing medium; and the first ink is ejected to the unit area in the scan posterior to the scan in which the third ink is ejected.

15. The image processing apparatus according to claim 14, wherein the image processing apparatus comprises the printing head and the scan unit.

16. An image processing method including a determination step for determining ejection amounts of a first ink, a second ink having a higher printing density than that of the first ink and a lower resin density than that of the first ink, and a third ink having a higher printing density than that of the first ink and that of the second ink and a lower resin density than that of the first ink to a printing medium based on an image data for printing an image using a printing head for ejecting the first ink, the second ink, and the third ink, with each of the first, second and third inks being an achromatic pigment ink, wherein, when printing at least a part of gradations in a gradation area of the image data for ejecting the third ink, the ejection amounts are determined in the determination step so as to eject a first ink to the printing medium.

17. The image processing method according to claim 16, wherein, when printing all the gradations in a gradation area of the image data for ejecting the third ink to a unit area of the printing medium, the ejection amounts are determined in the determination step so as to eject the first ink to the printing medium.

18. The image processing method according to claim 16, wherein the second ink and the third ink have equal resin densities.

19. The image processing method according to claim 16, wherein, in printing a gray line image, the gradation area of the image data for ejecting the third ink to a unit area of the printing medium has a gradation having a density higher than that of the gradation in which the ejection amount of the first ink is the maximum.

20. The image processing method according to claim 19, wherein, when printing a part of gradations in a gradation area of the image data for ejecting the third ink to the unit area, the ejection amounts are determined in the determination step so as to eject the first ink and the second ink to the printing medium, and to eject the first ink in an amount that is less than the maximum and more than the amount of the second ink.

21. The image processing method according to claim 16, wherein the first ink is a light gray ink, the second ink is a gray ink, and the third ink is a black ink.

22. The image processing method according to claim 16, the method further including a control step for controlling the printing head and a scan unit in such a manner that: with a relative scan of the printing medium and the printing head by the scan unit, the first ink, the second ink, and the third ink are ejected; printing is performed by a plurality of the scans to a unit area of the printing medium; and the first ink is ejected to the unit area in the scan posterior to the scan in which the third ink is ejected.

23. An inkjet printing method, including:
a determination step for determining ejection amounts of a first ink, a second ink having a higher printing density than that of the first ink and a lower resin density than that of the first ink, and a third ink having a higher printing density than that of the first ink and that of the second ink and a lower resin density than that of the first ink, with each of the first, the second and the third inks being an achromatic pigment ink, based on an image data; and a printing step for printing an image on the printing medium with a printing head for ejecting the first ink, the second ink, and the third ink, wherein, when printing at least a part of gradations in a gradation area of the image data for ejecting the third ink, the ejection amounts are determined in the determination step so as to eject a first ink to the printing medium, and in the printing step, according to the ejection amounts determined in the determination step, ink is ejected from the printing head to print an image on the printing medium.

* * * * *